(12) United States Patent
Noyes et al.

(10) Patent No.: US 10,815,124 B2
(45) Date of Patent: Oct. 27, 2020

(54) SOLID CARBON PRODUCTS COMPRISING CARBON NANOTUBES AND METHODS OF FORMING SAME

(71) Applicant: Seerstone LLC, Provo, UT (US)

(72) Inventors: Dallas B. Noyes, Sandy, UT (US); Randall Smith, Provo, UT (US)

(73) Assignee: Seerstone LLC, Provo, UT (US)

( * ) Notice: Subject to any disclaimer, the term of this patent is extended or adjusted under 35 U.S.C. 154(b) by 324 days.

(21) Appl. No.: 15/663,392

(22) Filed: Jul. 28, 2017

(65) Prior Publication Data

US 2017/0334725 A1    Nov. 23, 2017

Related U.S. Application Data

(60) Continuation-in-part of application No. 15/470,587, filed on Mar. 27, 2017, now abandoned, which is a
(Continued)

(51) Int. Cl.
*B29C 67/04* (2017.01)
*B82Y 40/00* (2011.01)
(Continued)

(52) U.S. Cl.
CPC .......... *C01B 32/162* (2017.08); *B29C 43/003* (2013.01); *B29C 43/006* (2013.01);
(Continued)

(58) Field of Classification Search
CPC ........... C01B 2202/02; C01B 2202/06; C01B 2202/0273; C01B 2202/22;
(Continued)

(56) References Cited

U.S. PATENT DOCUMENTS 1,478,730 A    12/1923    Brownlee
1,735,925 A    11/1929    Jaeger
(Continued)

FOREIGN PATENT DOCUMENTS

CN    1658435 A    8/2005
EP    0945402 A1    9/1999
(Continued)

OTHER PUBLICATIONS

Zhou "From Microjoining to Nanojoining." The Open Surface Science Journal, 2011, 3, 32-41 (Year: 2011).*
(Continued)

*Primary Examiner* — Tri V Nguyen
(74) *Attorney, Agent, or Firm* — TraskBritt

(57) ABSTRACT

Methods of forming solid carbon products include disposing a plurality of nanotubes in a press, and applying heat to the plurality of carbon nanotubes to form the solid carbon product. Further processing may include sintering the solid carbon product to form a plurality of covalently bonded carbon nanotubes. The solid carbon product includes a plurality of voids between the carbon nanotubes having a median minimum dimension of less than about 100 nm. Some methods include compressing a material comprising carbon nanotubes, heating the compressed material in a non-reactive environment to form covalent bonds between adjacent carbon nanotubes to form a sintered solid carbon product, and cooling the sintered solid carbon product to a temperature at which carbon of the carbon nanotubes do not oxidize prior to removing the resulting solid carbon product for further processing, shipping, or use.

13 Claims, 14 Drawing Sheets

Related U.S. Application Data division of application No. 14/414,232, filed as application No. PCT/US2013/049719 on Jul. 9, 2013, now Pat. No. 9,604,848.

(60) Provisional application No. 61/671,022, filed on Jul. 12, 2012.

(51) Int. Cl.

| | | |
|---|---|---|
| *C01B 32/162* | (2017.01) | |
| *C01B 32/16* | (2017.01) | |
| *B82Y 30/00* | (2011.01) | |
| *C04B 35/645* | (2006.01) | |
| *C04B 35/83* | (2006.01) | |
| *H01B 1/04* | (2006.01) | |
| *B29C 43/00* | (2006.01) | |
| *B29C 67/24* | (2006.01) | |
| *C01B 32/158* | (2017.01) | |
| *C01B 32/00* | (2017.01) | |
| *C01B 32/05* | (2017.01) | |
| *B29K 105/00* | (2006.01) | |
| *B29C 43/18* | (2006.01) | |
| *B29K 105/12* | (2006.01) | |
| *B29C 43/02* | (2006.01) | |
| *B29K 105/24* | (2006.01) | |

(52) U.S. Cl.
CPC .............. *B29C 67/04* (2013.01); *B29C 67/24* (2013.01); *B82Y 30/00* (2013.01); *C01B 32/00* (2017.08); *C01B 32/05* (2017.08); *C01B 32/158* (2017.08); *C01B 32/16* (2017.08); *C04B 35/645* (2013.01); *C04B 35/83* (2013.01); *H01B 1/04* (2013.01); *B29C 43/02* (2013.01); *B29C 43/18* (2013.01); *B29K 2105/0014* (2013.01); *B29K 2105/124* (2013.01); *B29K 2105/246* (2013.01); *B29K 2105/251* (2013.01); *B82Y 40/00* (2013.01); *C01P 2006/40* (2013.01); *C01P 2006/90* (2013.01); *C04B 2235/5288* (2013.01); *C04B 2235/604* (2013.01); *C04B 2235/6021* (2013.01); *C04B 2235/656* (2013.01); *C04B 2235/658* (2013.01); *C04B 2235/6562* (2013.01); *C04B 2235/6565* (2013.01); *C04B 2235/6567* (2013.01); *C04B 2235/665* (2013.01); *C04B 2235/666* (2013.01); *C04B 2235/77* (2013.01)

(58) Field of Classification Search
CPC ... C01B 2202/36; C01B 32/00; C01B 32/158; C04B 2235/665; B82Y 40/00
USPC ................ 252/500, 502, 506; 977/842, 900; 423/447.1, 447.3
See application file for complete search history.

(56) References Cited

U.S. PATENT DOCUMENTS

| | | |
|---|---|---|
| 1,746,464 A | 2/1930 | Franz et al. |
| 1,964,744 A | 7/1934 | Odell |
| 2,404,869 A | 7/1946 | Sorrentino |
| 2,429,980 A | 11/1947 | Allinson |
| 2,440,424 A | 4/1948 | Wiegand et al. |
| 2,731,328 A | 1/1956 | Atkinson |
| 2,745,973 A | 5/1956 | Rappaport |
| 2,796,327 A | 6/1957 | Pollock |
| 2,796,331 A | 6/1957 | Kauffman et al. |
| 2,800,616 A | 7/1957 | Becker |
| 2,811,653 A | 10/1957 | Moore |
| 2,819,414 A | 1/1958 | Sherwood et al. |
| 2,837,666 A | 6/1958 | Linder |
| 2,976,433 A | 3/1961 | Rappaport et al. |
| 3,094,634 A | 6/1963 | Rappaport |
| 3,172,774 A | 3/1965 | Diefendorf |
| 3,249,830 A | 5/1966 | Adany |
| 3,378,345 A | 4/1968 | Bourdeau et al. |
| 3,634,999 A | 1/1972 | Howard et al. |
| 3,714,474 A | 1/1973 | Hoff |
| 3,771,959 A | 11/1973 | Fletcher et al. |
| 3,846,478 A | 11/1974 | Cummins |
| 3,905,748 A | 9/1975 | Cairo et al. |
| 4,024,420 A | 5/1977 | Anthony et al. |
| 4,126,000 A | 11/1978 | Funk |
| 4,197,281 A | 4/1980 | Muenger |
| 4,200,554 A | 4/1980 | Lauder |
| 4,602,477 A | 7/1986 | Lucadamo |
| 4,628,143 A | 12/1986 | Brotz |
| 4,663,230 A | 5/1987 | Tennent |
| 4,710,483 A | 12/1987 | Burk et al. |
| 4,725,346 A | 2/1988 | Joshi |
| 4,727,207 A | 2/1988 | Paparizos et al. |
| 4,746,458 A | 5/1988 | Brotz |
| 4,900,368 A | 2/1990 | Brotz |
| 5,008,579 A | 4/1991 | Conley et al. |
| 5,021,139 A | 6/1991 | Hartig et al. |
| 5,082,505 A | 1/1992 | Cota et al. |
| 5,122,332 A | 6/1992 | Russell |
| 5,133,190 A | 7/1992 | Abdelmalek |
| 5,149,584 A | 9/1992 | Baker et al. |
| 5,187,030 A | 2/1993 | Firmin et al. |
| 5,260,621 A | 11/1993 | Little et al. |
| 5,396,141 A | 3/1995 | Jantz et al. |
| 5,413,866 A | 5/1995 | Baker et al. |
| 5,456,897 A | 10/1995 | Moy et al. |
| 5,526,374 A | 6/1996 | Uebber |
| 5,531,424 A | 7/1996 | Whipp |
| 5,569,635 A | 10/1996 | Moy et al. |
| 5,572,544 A | 11/1996 | Mathur et al. |
| 5,578,543 A | 11/1996 | Tennent et al. |
| 5,589,152 A | 12/1996 | Tennent et al. |
| 5,624,542 A | 4/1997 | Shen et al. |
| 5,641,466 A | 6/1997 | Ebbesen et al. |
| 5,648,056 A | 7/1997 | Tanaka |
| 5,650,370 A | 7/1997 | Tennent et al. |
| 5,691,054 A | 11/1997 | Tennent et al. |
| 5,707,916 A | 1/1998 | Snyder et al. |
| 5,726,116 A | 3/1998 | Moy et al. |
| 5,747,161 A | 5/1998 | Iijima |
| 5,780,101 A | 7/1998 | Nolan et al. |
| 5,859,484 A | 1/1999 | Mannik et al. |
| 5,877,110 A | 3/1999 | Snyder et al. |
| 5,910,238 A | 6/1999 | Cable et al. |
| 5,965,267 A | 10/1999 | Nolan et al. |
| 5,997,832 A | 12/1999 | Lieber et al. |
| 6,099,965 A | 8/2000 | Tennent et al. |
| 6,159,892 A | 12/2000 | Moy et al. |
| 6,183,714 B1 | 2/2001 | Smalley et al. |
| 6,203,814 B1 | 3/2001 | Fisher et al. |
| 6,221,330 B1 | 4/2001 | Moy et al. |
| 6,232,706 B1 | 5/2001 | Dai et al. |
| 6,239,057 B1 | 5/2001 | Ichikawa et al. |
| 6,261,532 B1 | 7/2001 | Ono |
| 6,262,129 B1 | 7/2001 | Murray et al. |
| 6,294,144 B1 | 9/2001 | Moy et al. |
| 6,333,016 B1 | 12/2001 | Resasco et al. |
| 6,346,189 B1 | 2/2002 | Dai et al. |
| 6,361,861 B2 | 3/2002 | Gao |
| 6,375,917 B1 | 4/2002 | Mandeville et al. |
| 6,413,487 B1 | 7/2002 | Resasco et al. |
| 6,423,288 B2 | 7/2002 | Mandeville et al. |
| 6,426,442 B1 | 7/2002 | Ichikawa et al. |
| 6,465,813 B2 | 10/2002 | Ihm |
| 6,518,218 B1 | 2/2003 | Sun et al. |
| 6,596,101 B2 | 7/2003 | Weihs et al. |
| 6,645,455 B2 | 11/2003 | Margrave et al. |
| 6,683,783 B1 | 1/2004 | Smalley et al. |
| 6,686,311 B2 | 2/2004 | Sun et al. |
| 6,692,717 B1 | 2/2004 | Smalley et al. |
| 6,713,519 B2 | 3/2004 | Wang et al. |

(56) References Cited

U.S. PATENT DOCUMENTS

| | | |
|---|---|---|
| 6,749,827 B2 | 6/2004 | Smalley et al. |
| 6,761,870 B1 | 7/2004 | Smalley et al. |
| 6,790,425 B1 | 9/2004 | Smalley et al. |
| 6,800,369 B2 | 10/2004 | Gimzewski et al. |
| 6,827,918 B2 | 12/2004 | Margrave et al. |
| 6,827,919 B1 | 12/2004 | Moy et al. |
| 6,835,330 B2 | 12/2004 | Nishino et al. |
| 6,835,366 B1 | 12/2004 | Margrave et al. |
| 6,841,139 B2 | 1/2005 | Margrave et al. |
| 6,843,843 B2 | 1/2005 | Takahashi et al. |
| 6,855,301 B1 | 2/2005 | Rich et al. |
| 6,855,593 B2 | 2/2005 | Andoh |
| 6,875,412 B2 | 4/2005 | Margrave et al. |
| 6,890,986 B2 | 5/2005 | Pruett |
| 6,899,945 B2 | 5/2005 | Smalley et al. |
| 6,905,544 B2 | 6/2005 | Setoguchi et al. |
| 6,913,740 B2 | 7/2005 | Polverejan et al. |
| 6,913,789 B2 | 7/2005 | Smalley et al. |
| 6,916,434 B2 | 7/2005 | Nishino et al. |
| 6,919,064 B2 | 7/2005 | Resasco et al. |
| 6,936,233 B2 | 8/2005 | Smalley et al. |
| 6,949,237 B2 | 9/2005 | Smalley et al. |
| 6,955,800 B2 | 10/2005 | Resasco et al. |
| 6,960,389 B2 | 11/2005 | Tennent et al. |
| 6,962,685 B2 | 11/2005 | Sun |
| 6,979,709 B2 | 12/2005 | Smalley et al. |
| 6,986,876 B2 | 1/2006 | Smalley et al. |
| 6,994,907 B2 | 2/2006 | Resasco et al. |
| 6,998,358 B2 | 2/2006 | French et al. |
| 7,011,771 B2 | 3/2006 | Gao et al. |
| 7,041,620 B2 | 5/2006 | Smalley et al. |
| 7,045,108 B2 | 5/2006 | Jiang et al. |
| 7,048,999 B2 | 5/2006 | Smalley et al. |
| 7,052,668 B2 | 5/2006 | Smalley et al. |
| 7,067,098 B2 | 6/2006 | Colbert et al. |
| 7,071,406 B2 | 7/2006 | Smalley et al. |
| 7,074,379 B2 | 7/2006 | May et al. |
| 7,094,385 B2 | 8/2006 | Beguin et al. |
| 7,094,386 B2 | 8/2006 | Resasco et al. |
| 7,094,679 B1 | 8/2006 | Li et al. |
| 7,097,820 B2 | 8/2006 | Colbert et al. |
| 7,105,596 B2 | 9/2006 | Smalley et al. |
| 7,125,534 B1 | 10/2006 | Smalley et al. |
| 7,132,062 B1 | 11/2006 | Howard |
| 7,135,159 B2 | 11/2006 | Shaffer et al. |
| 7,135,160 B2 | 11/2006 | Yang et al. |
| 7,138,100 B2 | 11/2006 | Smalley et al. |
| 7,150,864 B1 | 12/2006 | Smalley et al. |
| 7,157,068 B2 | 1/2007 | Li et al. |
| 7,160,532 B2 | 1/2007 | Liu et al. |
| 7,169,329 B2 | 1/2007 | Wong et al. |
| 7,201,887 B2 | 4/2007 | Smalley et al. |
| 7,204,970 B2 | 4/2007 | Smalley et al. |
| 7,205,069 B2 | 4/2007 | Smalley et al. |
| 7,212,147 B2 | 5/2007 | Messano |
| 7,214,360 B2 | 5/2007 | Chen et al. |
| 7,244,373 B1 | 7/2007 | Anazawa et al. |
| 7,250,148 B2 | 7/2007 | Yang et al. |
| 7,270,795 B2 | 9/2007 | Kawakami et al. |
| 7,291,318 B2 | 11/2007 | Sakurabayashi et al. |
| 7,338,648 B2 | 3/2008 | Harutyunyan et al. |
| 7,365,289 B2 | 4/2008 | Wilkes et al. |
| 7,374,793 B2 | 5/2008 | Furukawa et al. |
| 7,390,477 B2 | 6/2008 | Smalley et al. |
| 7,396,798 B2 | 7/2008 | Ma et al. |
| 7,408,186 B2 | 8/2008 | Merkulov et al. |
| 7,410,628 B2 | 8/2008 | Bening et al. |
| 7,413,723 B2 | 8/2008 | Niu et al. |
| 7,452,828 B2 | 11/2008 | Hirakata et al. |
| 7,459,137 B2 | 12/2008 | Tour et al. |
| 7,459,138 B2 | 12/2008 | Resasco et al. |
| 7,473,873 B2 | 1/2009 | Bids et al. |
| 7,510,695 B2 | 3/2009 | Smalley et al. |
| 7,527,780 B2 | 5/2009 | Margrave et al. |
| 7,563,427 B2 | 7/2009 | Wei et al. |
| 7,563,428 B2 | 7/2009 | Resasco et al. |
| 7,569,203 B2 | 8/2009 | Fridman et al. |
| 7,572,426 B2 | 8/2009 | Strano et al. |
| 7,585,482 B2 | 9/2009 | Resasco et al. |
| 7,585,483 B2 | 9/2009 | Edwin et al. |
| 7,592,389 B2 | 9/2009 | Baker |
| 7,601,322 B2 | 10/2009 | Huang |
| 7,611,579 B2 | 11/2009 | Lashmore et al. |
| 7,615,204 B2 | 11/2009 | Ajayan et al. |
| 7,618,599 B2 | 11/2009 | Kim et al. |
| 7,622,059 B2 | 11/2009 | Bordere et al. |
| 7,632,569 B2 | 12/2009 | Smalley et al. |
| 7,645,933 B2 | 1/2010 | Narkis et al. |
| 7,655,302 B2 | 2/2010 | Smalley et al. |
| 7,670,510 B2 | 3/2010 | Wong et al. |
| 7,700,065 B2 | 4/2010 | Fujioka et al. |
| 7,704,481 B2 | 4/2010 | Higashi et al. |
| 7,718,283 B2 | 5/2010 | Raffaelle et al. |
| 7,719,265 B2 | 5/2010 | Harutyunyan et al. |
| 7,731,930 B2 | 6/2010 | Taki et al. |
| 7,736,741 B2 | 6/2010 | Maruyama et al. |
| 7,740,825 B2 | 6/2010 | Tohji et al. |
| 7,749,477 B2 | 7/2010 | Jiang et al. |
| 7,754,182 B2 | 7/2010 | Jiang et al. |
| 7,772,447 B2 | 8/2010 | Iaccino et al. |
| 7,780,939 B2 | 8/2010 | Margrave et al. |
| 7,785,558 B2 | 8/2010 | Hikata |
| 7,790,228 B2 | 9/2010 | Suekane et al. |
| 7,794,690 B2 | 9/2010 | Abatzoglou et al. |
| 7,794,797 B2 | 9/2010 | Vasenkov |
| 7,799,246 B2 | 9/2010 | Bordere et al. |
| 7,811,542 B1 | 10/2010 | McElrath et al. |
| 7,824,648 B2 | 11/2010 | Jiang et al. |
| 7,837,968 B2 | 11/2010 | Chang et al. |
| 7,838,843 B2 | 11/2010 | Kawakami et al. |
| 7,842,271 B2 | 11/2010 | Petrik |
| 7,854,945 B2 | 12/2010 | Fischer et al. |
| 7,854,991 B2 | 12/2010 | Hata et al. |
| 7,858,648 B2 | 12/2010 | Bianco et al. |
| 7,871,591 B2 | 1/2011 | Harutyunyan et al. |
| 7,883,995 B2 | 2/2011 | Mitchell et al. |
| 7,887,774 B2 | 2/2011 | Strano et al. |
| 7,888,543 B2 | 2/2011 | Iaccino et al. |
| 7,897,209 B2 | 3/2011 | Shibuya et al. |
| 7,901,654 B2 | 3/2011 | Harutyunyan |
| 7,906,095 B2 | 3/2011 | Kawabata |
| 7,919,065 B2 | 4/2011 | Pedersen et al. |
| 7,923,403 B2 | 4/2011 | Ma et al. |
| 7,923,615 B2 | 4/2011 | Silvy et al. |
| 7,932,419 B2 | 4/2011 | Liu et al. |
| 7,947,245 B2 | 5/2011 | Tada et al. |
| 7,951,351 B2 | 5/2011 | Ma et al. |
| 7,964,174 B2 | 6/2011 | Dubin et al. |
| 7,981,396 B2 | 7/2011 | Harutyunyan |
| 7,988,861 B2 | 8/2011 | Pham-Huu et al. |
| 7,993,594 B2 | 8/2011 | Wei et al. |
| 8,012,447 B2 | 9/2011 | Harutyunyan et al. |
| 8,017,282 B2 | 9/2011 | Choi et al. |
| 8,017,892 B2 | 9/2011 | Biris et al. |
| 8,038,908 B2 | 10/2011 | Hirai et al. |
| 8,114,518 B2 | 2/2012 | Hata et al. |
| 8,138,384 B2 | 3/2012 | Iaccino et al. |
| 8,173,096 B2 | 5/2012 | Chang et al. |
| 8,178,049 B2 | 5/2012 | Shiraki et al. |
| 8,226,902 B2 | 7/2012 | Jang et al. |
| 8,314,044 B2 | 11/2012 | Jangbarwala |
| 8,679,444 B2 | 3/2014 | Noyes |
| 9,090,472 B2 | 7/2015 | Noyes |
| 9,221,685 B2 | 12/2015 | Noyes |
| 9,475,699 B2 | 10/2016 | Noyes |
| 2001/0009119 A1 | 7/2001 | Murray et al. |
| 2002/0004136 A1 | 1/2002 | Gao et al. |
| 2002/0054849 A1 | 5/2002 | Baker et al. |
| 2002/0102193 A1 | 8/2002 | Smalley et al. |
| 2002/0102196 A1 | 8/2002 | Smalley et al. |
| 2002/0127169 A1 | 9/2002 | Smalley et al. |
| 2002/0127170 A1 | 9/2002 | Hong et al. |
| 2002/0131910 A1 | 9/2002 | Resasco et al. |
| 2002/0172767 A1 | 11/2002 | Grigorian et al. |

(56) References Cited

U.S. PATENT DOCUMENTS

| | | |
|---|---|---|
| 2003/0059364 A1 | 3/2003 | Prilutskiy |
| 2003/0147802 A1 | 8/2003 | Smalley et al. |
| 2003/0194362 A1 | 10/2003 | Rogers et al. |
| 2004/0053440 A1 | 3/2004 | Lai et al. |
| 2004/0070009 A1 | 4/2004 | Resasco et al. |
| 2004/0105807 A1 | 6/2004 | Fan et al. |
| 2004/0111968 A1 | 6/2004 | Day et al. |
| 2004/0151654 A1 | 8/2004 | Wei et al. |
| 2004/0194705 A1 | 10/2004 | Dai et al. |
| 2004/0197260 A1 | 10/2004 | Resasco et al. |
| 2004/0202603 A1 | 10/2004 | Fischer et al. |
| 2004/0222080 A1 | 11/2004 | Tour et al. |
| 2004/0223901 A1 | 11/2004 | Smalley et al. |
| 2004/0234445 A1 | 11/2004 | Serp et al. |
| 2004/0247503 A1 | 12/2004 | Hyeon |
| 2004/0265212 A1 | 12/2004 | Varadan et al. |
| 2005/0002850 A1 | 1/2005 | Niu et al. |
| 2005/0002851 A1 | 1/2005 | McElrath et al. |
| 2005/0025695 A1 | 2/2005 | Pradhan |
| 2005/0042162 A1 | 2/2005 | Resasco et al. |
| 2005/0046322 A1 | 3/2005 | Kim et al. |
| 2005/0074392 A1 | 4/2005 | Yang et al. |
| 2005/0079118 A1 | 4/2005 | Maruyama et al. |
| 2005/0100499 A1 | 5/2005 | Oya et al. |
| 2005/0176990 A1 | 8/2005 | Coleman et al. |
| 2005/0244325 A1 | 11/2005 | Nam et al. |
| 2005/0276743 A1 | 12/2005 | Lacombe et al. |
| 2006/0013757 A1 | 1/2006 | Edwin et al. |
| 2006/0032330 A1 | 2/2006 | Sato |
| 2006/0039849 A1 | 2/2006 | Resasco et al. |
| 2006/0045837 A1 | 3/2006 | Nishimura |
| 2006/0078489 A1 | 4/2006 | Harutyunyan et al. |
| 2006/0104884 A1 | 5/2006 | Shaffer et al. |
| 2006/0104886 A1 | 5/2006 | Wilson |
| 2006/0104887 A1 | 5/2006 | Fujioka et al. |
| 2006/0133990 A1 | 6/2006 | Hyeon et al. |
| 2006/0141346 A1 | 6/2006 | Gordon et al. |
| 2006/0165988 A1 | 7/2006 | Chiang et al. |
| 2006/0191835 A1 | 8/2006 | Petrik et al. |
| 2006/0199770 A1 | 9/2006 | Bianco et al. |
| 2006/0204426 A1 | 9/2006 | Akins et al. |
| 2006/0225534 A1 | 10/2006 | Swihart et al. |
| 2006/0228286 A1 | 10/2006 | Tada et al. |
| 2006/0239890 A1 | 10/2006 | Chang et al. |
| 2006/0239891 A1 | 10/2006 | Niu et al. |
| 2006/0245996 A1 | 11/2006 | Xie et al. |
| 2006/0274049 A1 | 12/2006 | Spath et al. |
| 2006/0275956 A1 | 12/2006 | Konesky |
| 2007/0003470 A1 | 1/2007 | Smalley et al. |
| 2007/0020168 A1 | 1/2007 | Asmussen et al. |
| 2007/0031320 A1 | 2/2007 | Jiang et al. |
| 2007/0080605 A1 | 4/2007 | Chandrashekhar et al. |
| 2007/0116631 A1 | 5/2007 | Li et al. |
| 2007/0148962 A1 | 6/2007 | Kauppinen et al. |
| 2007/0149392 A1 | 6/2007 | Ku et al. |
| 2007/0183959 A1 | 8/2007 | Charlier et al. |
| 2007/0189953 A1 | 8/2007 | Bai et al. |
| 2007/0207318 A1 | 9/2007 | Jin et al. |
| 2007/0209093 A1 | 9/2007 | Tohji et al. |
| 2007/0253886 A1 | 11/2007 | Abatzoglou et al. |
| 2007/0264187 A1 | 11/2007 | Harutyunyan et al. |
| 2007/0266825 A1 | 11/2007 | Ripley et al. |
| 2007/0280876 A1 | 12/2007 | Tour et al. |
| 2007/0281087 A1 | 12/2007 | Harutyunyan et al. |
| 2007/0290409 A1* | 12/2007 | Brice ............... B29C 70/12 264/401 |
| 2008/0003170 A1 | 1/2008 | Buchholz et al. |
| 2008/0003182 A1 | 1/2008 | Wilson et al. |
| 2008/0008760 A1 | 1/2008 | Bianco et al. |
| 2008/0014654 A1 | 1/2008 | Weisman et al. |
| 2008/0095695 A1 | 4/2008 | Shanov et al. |
| 2008/0118426 A1 | 5/2008 | Li et al. |
| 2008/0134942 A1 | 6/2008 | Brenner et al. |
| 2008/0160312 A1 | 7/2008 | Furukawa et al. |
| 2008/0169061 A1 | 7/2008 | Tour et al. |
| 2008/0176069 A1 | 7/2008 | Ma et al. |
| 2008/0182155 A1 | 7/2008 | Choi et al. |
| 2008/0193367 A1 | 8/2008 | Kalck et al. |
| 2008/0217588 A1 | 9/2008 | Arnold et al. |
| 2008/0226538 A1 | 9/2008 | Rumpf et al. |
| 2008/0233402 A1 | 9/2008 | Carlson et al. |
| 2008/0260618 A1 | 10/2008 | Kawabata |
| 2008/0274277 A1 | 11/2008 | Rashidi et al. |
| 2008/0279753 A1 | 11/2008 | Harutyunyan |
| 2008/0280136 A1 | 11/2008 | Zachariah et al. |
| 2008/0296537 A1 | 12/2008 | Gordon et al. |
| 2008/0299029 A1 | 12/2008 | Grosboll et al. |
| 2008/0305028 A1 | 12/2008 | McKeigue et al. |
| 2008/0305029 A1 | 12/2008 | McKeigue et al. |
| 2008/0305030 A1 | 12/2008 | McKeigue et al. |
| 2008/0318357 A1 | 12/2008 | Raffaelle et al. |
| 2009/0001326 A1 | 1/2009 | Sato et al. |
| 2009/0004075 A1 | 1/2009 | Chung et al. |
| 2009/0011128 A1 | 1/2009 | Oshima et al. |
| 2009/0035569 A1 | 2/2009 | Gonzalez Moral et al. |
| 2009/0056802 A1 | 3/2009 | Rabani |
| 2009/0074634 A1 | 3/2009 | Tada et al. |
| 2009/0081454 A1 | 3/2009 | Axmann et al. |
| 2009/0087371 A1 | 4/2009 | Jang et al. |
| 2009/0087622 A1 | 4/2009 | Busnaina et al. |
| 2009/0124705 A1 | 5/2009 | Meyer et al. |
| 2009/0134363 A1 | 5/2009 | Bordere et al. |
| 2009/0136413 A1 | 5/2009 | Li et al. |
| 2009/0140215 A1 | 6/2009 | Buchholz et al. |
| 2009/0186223 A1 | 7/2009 | Saito et al. |
| 2009/0191352 A1 | 7/2009 | DuFaux et al. |
| 2009/0203519 A1 | 8/2009 | Abatzoglou et al. |
| 2009/0208388 A1 | 8/2009 | McKeigue et al. |
| 2009/0208708 A1 | 8/2009 | Wei et al. |
| 2009/0220392 A1 | 9/2009 | McKeigue et al. |
| 2009/0226704 A1 | 9/2009 | Kauppinen et al. |
| 2009/0257945 A1 | 10/2009 | Biris et al. |
| 2009/0286084 A1 | 11/2009 | Tennent et al. |
| 2009/0286675 A1 | 11/2009 | Wei et al. |
| 2009/0294753 A1 | 12/2009 | Hauge et al. |
| 2009/0297846 A1 | 12/2009 | Hata et al. |
| 2009/0297847 A1 | 12/2009 | Kim et al. |
| 2009/0301349 A1 | 12/2009 | Afzali-Ardakani et al. |
| 2010/0004468 A1 | 1/2010 | Wong et al. |
| 2010/0009204 A1 | 1/2010 | Noguchi et al. |
| 2010/0028735 A1 | 2/2010 | Basset et al. |
| 2010/0034725 A1 | 2/2010 | Harutyunyan |
| 2010/0062229 A1 | 3/2010 | Hata et al. |
| 2010/0065776 A1 | 3/2010 | Han et al. |
| 2010/0074811 A1 | 3/2010 | McKeigue et al. |
| 2010/0081568 A1 | 4/2010 | Bedworth |
| 2010/0104332 A1* | 4/2010 | Law ............... G03G 15/2007 399/328 |
| 2010/0104808 A1 | 4/2010 | Fan et al. |
| 2010/0129654 A1 | 5/2010 | Jiang et al. |
| 2010/0132259 A1 | 6/2010 | Haque |
| 2010/0132883 A1 | 6/2010 | Burke et al. |
| 2010/0150810 A1 | 6/2010 | Yoshida et al. |
| 2010/0158788 A1 | 6/2010 | Kim et al. |
| 2010/0159222 A1 | 6/2010 | Hata et al. |
| 2010/0160155 A1 | 6/2010 | Liang |
| 2010/0167053 A1 | 7/2010 | Sung et al. |
| 2010/0173037 A1 | 7/2010 | Jiang et al. |
| 2010/0173153 A1 | 7/2010 | Hata et al. |
| 2010/0196249 A1 | 8/2010 | Hata et al. |
| 2010/0196600 A1 | 8/2010 | Shibuya et al. |
| 2010/0209696 A1 | 8/2010 | Seals et al. |
| 2010/0213419 A1 | 8/2010 | Jiang et al. |
| 2010/0221173 A1 | 9/2010 | Tennent et al. |
| 2010/0222432 A1 | 9/2010 | Hua |
| 2010/0226848 A1 | 9/2010 | Nakayama et al. |
| 2010/0230642 A1 | 9/2010 | Kim et al. |
| 2010/0239489 A1 | 9/2010 | Harutyunyan et al. |
| 2010/0254860 A1 | 10/2010 | Shiraki et al. |
| 2010/0254886 A1 | 10/2010 | McElrath et al. |
| 2010/0260927 A1 | 10/2010 | Gordon et al. |
| 2010/0278717 A1 | 11/2010 | Suzuki et al. |
| 2010/0298125 A1 | 11/2010 | Kim et al. |
| 2010/0301278 A1 | 12/2010 | Hirai et al. |

(56) References Cited

U.S. PATENT DOCUMENTS

| | | | |
|---|---|---|---|
| 2010/0303675 A1 | 12/2010 | Suekane et al. | |
| 2010/0316556 A1 | 12/2010 | Wei et al. | |
| 2010/0316562 A1 | 12/2010 | Carruthers et al. | |
| 2010/0317790 A1 | 12/2010 | Jang et al. | |
| 2010/0320437 A1 | 12/2010 | Gordon et al. | |
| 2011/0008617 A1 | 1/2011 | Hata et al. | |
| 2011/0014368 A1 | 1/2011 | Vasenkov | |
| 2011/0020211 A1 | 1/2011 | Jayatissa | |
| 2011/0024697 A1 | 2/2011 | Biris et al. | |
| 2011/0027162 A1 | 2/2011 | Steiner, III et al. | |
| 2011/0027163 A1 | 2/2011 | Shinohara et al. | |
| 2011/0033367 A1 | 2/2011 | Riehl et al. | |
| 2011/0039124 A1 | 2/2011 | Ikeuchi et al. | |
| 2011/0053020 A1 | 3/2011 | Norton et al. | |
| 2011/0053050 A1 | 3/2011 | Lim et al. | |
| 2011/0060087 A1 | 3/2011 | Noguchi et al. | |
| 2011/0085961 A1 | 4/2011 | Noda et al. | |
| 2011/0110842 A1 | 5/2011 | Haddon | |
| 2011/0117365 A1 | 5/2011 | Hata et al. | |
| 2011/0120138 A1 | 5/2011 | Gaiffi et al. | |
| 2011/0150746 A1 | 6/2011 | Khodadadi et al. | |
| 2011/0155964 A1 | 6/2011 | Arnold et al. | |
| 2011/0158892 A1 | 6/2011 | Yamaki | |
| 2011/0171109 A1 | 7/2011 | Petrik | |
| 2011/0174145 A1 | 7/2011 | Ogrin et al. | |
| 2011/0206469 A1 | 8/2011 | Furuyama et al. | |
| 2011/0298071 A9 | 12/2011 | Spencer et al. | |
| 2012/0034150 A1 | 2/2012 | Noyes | |
| 2012/0083408 A1 | 4/2012 | Sato et al. | |
| 2012/0093676 A1 | 4/2012 | Zoz et al. | |
| 2012/0107610 A1 | 5/2012 | Moravsky et al. | |
| 2012/0137664 A1 | 6/2012 | Shawabkeh et al. | |
| 2012/0148476 A1 | 6/2012 | Hata et al. | |
| 2012/0263935 A1 | 10/2012 | Ledford et al. | |
| 2013/0154438 A1 | 6/2013 | Tan Xing Haw | |
| 2014/0021827 A1 | 1/2014 | Noyes | |
| 2014/0090870 A1* | 4/2014 | Garnett | H01B 1/02 174/126.1 |
| 2014/0141248 A1 | 5/2014 | Noyes | |
| 2014/0348739 A1 | 11/2014 | Denton et al. | |
| 2015/0059527 A1 | 3/2015 | Noyes | |
| 2015/0059571 A1 | 3/2015 | Denton et al. | |
| 2015/0064092 A1 | 3/2015 | Noyes | |
| 2015/0064096 A1 | 3/2015 | Noyes | |
| 2015/0064097 A1 | 3/2015 | Noyes | |
| 2015/0071846 A1 | 3/2015 | Noyes | |
| 2015/0071848 A1 | 3/2015 | Denton et al. | |
| 2015/0078981 A1 | 3/2015 | Noyes | |
| 2015/0078982 A1 | 3/2015 | Noyes | |
| 2015/0086468 A1 | 3/2015 | Noyes | |
| 2015/0093323 A1 | 4/2015 | Koveal, Jr. et al. | |
| 2015/0114819 A1 | 4/2015 | Denton et al. | |
| 2015/0147259 A1 | 5/2015 | Noyes | |
| 2015/0147261 A1 | 5/2015 | Denton et al. | |
| 2015/0225242 A1 | 8/2015 | Noyes | |
| 2015/0291424 A1 | 10/2015 | Noyes | |
| 2015/0321918 A1 | 11/2015 | Noyes | |
| 2016/0016794 A1 | 1/2016 | Noyes | |
| 2016/0016800 A1 | 1/2016 | Noyes | |
| 2016/0016862 A1 | 1/2016 | Noyes | |
| 2016/0023902 A1 | 1/2016 | Noyes | |
| 2016/0027934 A1 | 1/2016 | Noyes | |
| 2016/0030925 A1 | 2/2016 | Noyes | |
| 2016/0030926 A1 | 2/2016 | Noyes | |
| 2016/0031710 A1 | 2/2016 | Noyes et al. | |
| 2016/0039677 A1 | 2/2016 | Noyes | |
| 2017/0197835 A1 | 7/2017 | Noyes | |
| 2017/0334725 A1 | 11/2017 | Noyes et al. | |

FOREIGN PATENT DOCUMENTS

| | | | |
|---|---|---|---|
| EP | 2186931 A1 | 5/2010 | |
| EP | 2404869 A1 | 1/2012 | |
| JP | 3339339 B2 | 10/2002 | |
| JP | 2004517789 A | 6/2004 | |
| JP | 2004360099 A | 12/2004 | |
| JP | 2005075725 A | 3/2005 | |
| JP | 2005532976 A | 11/2005 | |
| JP | 2007191840 A | 8/2007 | |
| KR | 1020050072056 A | 7/2005 | |
| KR | 10-2010-0008733 A | 1/2010 | |
| WO | 02/30816 A1 | 4/2002 | |
| WO | 03/18474 | 3/2003 | |
| WO | 2004/048263 A1 | 6/2004 | |
| WO | 2004096704 A3 | 11/2005 | |
| WO | 2005103348 A1 | 11/2005 | |
| WO | 2006003482 A3 | 8/2006 | |
| WO | 2007086909 A3 | 11/2007 | |
| WO | 2007139097 A1 | 12/2007 | |
| WO | 2007126412 A3 | 6/2008 | |
| WO | 2009011984 A1 | 1/2009 | |
| WO | 2006130150 A3 | 4/2009 | |
| WO | 2009122139 A1 | 10/2009 | |
| WO | 2009145959 A1 | 12/2009 | |
| WO | 2010047439 A1 | 4/2010 | |
| WO | 2010087903 A1 | 8/2010 | |
| WO | 2010120581 A1 | 10/2010 | |
| WO | 2011009071 A1 | 1/2011 | |
| WO | 2011020568 A1 | 2/2011 | |
| WO | 2011029144 A1 | 3/2011 | |
| WO | 2010146169 A3 | 4/2011 | |
| WO | 2010124258 A3 | 5/2011 | |
| WO | 2011053192 A2 | 5/2011 | |
| WO | 2013090274 A1 | 6/2013 | |
| WO | 2013/158155 A1 | 10/2013 | |
| WO | 2013/158156 A1 | 10/2013 | |
| WO | 2013/158159 A1 | 10/2013 | |
| WO | 2013/158160 A1 | 10/2013 | |
| WO | 2013/158161 A1 | 10/2013 | |
| WO | 2013/162650 A1 | 10/2013 | |
| WO | 2013158157 A1 | 10/2013 | |
| WO | 2013158158 A1 | 10/2013 | |
| WO | 2013158438 | 10/2013 | |
| WO | 2013158439 | 10/2013 | |
| WO | 2013158441 | 10/2013 | |
| WO | 2014/011206 A1 | 1/2014 | |
| WO | 2014/011631 A1 | 1/2014 | |
| WO | 2014/085378 A1 | 6/2014 | |

OTHER PUBLICATIONS

Bakshi ("Carbon nanotube reinforced metal matrix composites—a review." Intern Mater Rev, 55(1), pp. 41-64, pub 2010).

International Search Report and Written Opinion received for PCT Patent Application No. PCT/US18/43902, dated Oct. 12, 2018, 6 pages.

Kim ("Improvement of flexure strength and fracture toughness in alumina matrix composites reinforced with carbon nanotubes" Materials Sc and Eng A, 517, pp. 293-299, pub 2009).

Li ("Surface graphitization and mechanical properties of hot-pressed bulk carbon nanotubes compacted by spark plasma sintering." Carbon, 45, pp. 2636-2642, pub 23 Aug. 2007).

San-Miguel ("Nanomaterials under high-pressure." Chem Soc Rev, 35, pp. 876-889, pub 2006).

Wilson, Richard B., "Fundamental Investigation of the Bosch Reaction," PhD Dissertation, Massachusetts Institute of Technology, Jul. 1977, pp. 12,23, 37, 43, 44, 62, 70, 80, 83-88, 98.

Zeng, Z., and Natesan, K., Relationship between the Growth of Carbon Nanofilaments and Metal Dusting Corrosion, 2005, Chem. Mater. 2005, 17, 3794-3801.

Abatzoglou, Nicolas et al., "Green Diesel from Fischer-Tropsch Synthesis: Challenges and Hurdles," Proc. of the 3rd IASME/WSEAS Int. Conf. on Energy, Environment, Ecosystems and Sustainable Development, Agios Nikolaos, Greece, Jul. 24-26, 2007, pp. 223-232.

Abatzoglou, Nicolas et al., "The use of catalytic reforming reactions for C02 sequestration as carbon nanotubes," Proceedings of the 2006 IASMEIWSEAS International Conference on Energy & Environmental Systems, Chalkida, Greece, May 8-10, 2006 (pp. 21-26) (available at: http://www.wseas.us/e-library/conferences/2006evia/papers/516-1 9 3.pdf).

(56) References Cited

OTHER PUBLICATIONS

Baker, B. A. and G. D. Smith "Metal Dusting in a Laboratory Environment—Alloying Addition Effects," Special Metals Corporation, undated.
Baker, B. A. and G. D. Smith, "Alloy Solutions to Metal Dusting Problems in the PetroChemical Industry," Special Metals Corporation, undated.
Bogue, Robert, Powering Tomorrow's Sensor: A Review of Technologies—Part 1, Sensor Review, 2010, pp. 182-186, vol. 30, No. 3.
Cha, S. I., et al., "Mechanical and electrical properties of cross-linked carbon nanotubes," Carbon 46 (2008) 482-488, Elsevier, Ltd.
Cheng, H.M. et al., "Large-scale and low-cost synthesis of single-walled carbon nanotubes by the catalytic pyrolysis of hydrocarbons," Applied Physics Letters 72:3282-3284, Jun. 22, 1998 (available at: http://carbon.imr.ac.cn/file/journai/1998/98_APL_72_3282-ChengH M.pdf).
Notice of First Office Action of corresponding, copending Chinese Application No. 201380020288.2 dated Aug. 31, 2015, 3 pages.
Text of Notice of the First Office Action of corresponding, copending Chinese Application No. 201380020288.2 dated Aug. 31, 2015, 6 pages.
Chun, Changmin, and Ramanarayanan, Trikur A., "Metal Dusting Corrosion of Metals and Alloys," 2007.
Chung, U.C., and W.S. Chung, "Mechanism on Growth of Carbon Nanotubes Using CO—H2 Gas Mixture," Materials Science Forum vols. 475-479 (2005) pp. 3551-3554.
Dai, et al., "Single-wall nanotubes produced by metal-catalyzed disproportionation of carbon monoxide," Chemical Physics Letters 260 (1996) 471-475, Elsevier.
Dresselhaus et al., Carbon Nanotubes Synthesis, Structure, Properties, and Applications. 2001, pp. 1-9, Springer.
Garmirian, James Edwin, "Carbon Deposition in a Bosch Process Using a Cobalt and Nickel Catalyst," PhD Dissertation, Massachusetts Institute of Technology, Mar. 1980, pp. 14-185.
Grobert, Nicole, "Carbon nanotubes—becoming clean," Materials Today, vol. 10, No. 1-2, Jan.-Feb. 2007, Elsevier, pp. 28-35.
Hata, Kenji, "From Highly Efficient Impurity-Free CNT Synthesis to DWNT forests, CNTsolids and Super-Capacitors," unknown date, unknown publisher, Research Center for Advanced Carbon Materials, National Institute of Advanced Industrial Science and Technology (AIST), Tsukuba, 305-8565, Japan.
Hiraoka, Tatsuki, et al., "Synthesis of Single- and Double-Walled Carbon Nanotube Forests on Conducting Metal Foils," 9 J. Am. Chem. Soc. 2006, 128, 13338-13339.
Holmes, et al.; A Carbon Dioxide Reduction Unit Using Bosch Reaction and Expendable Catalyst Cartridges; NASA; 1970; available at https:J/archive.org/details/nasa_techdoc_1971 0002858.
Huang, Z.P., et al., "Growth of highly oriented carbon nanotubes by plasma-enhanced hot filament chemical vapor deposition," Applied Physics Letters 73:3845-3847, Dec. 28, 1998.
"Inconel® alloy 693—Excellent Resistance to Metal Dusting and High Temperature Corrosion" Special Metals Product Sheet, 2005.
Kavetsky et al., Chapter 2, Radioactive Materials, Ionizing Radiation Sources, and Radioluminescent Light Sources for Nuclear Batteries, Polymers, Phosphors, and Voltaics for Radioisotope Microbatteries, Edited by Bower et al., 2002, pp. 39-59, CRC Press.
Krestinin, A. V., et al. "Kinetics of Growth of Carbon Fibers on an Iron Catalyst in Methane Pyrolysis: A Measurement Procedure with the Use of an Optical Microscope," Kinetics and Catalysis, 2008, vol. 49, No. 1, pp. 68-78.
Lal, Arch It, "Effect of Gas Composition and Carbon Activity on the Growth of Carbon Nanotubes," Masters Thesis, University of Florida, 2003.
Manasse et al., Schottky Barrier Betavoltaic Battery, IEEE Transactions on Nuclear Science, vol. NS-23, No. 1, Feb. 1976, pp. 860-870.
Manning, Michael Patrick, "An Investigation of the Bosch Process," PhD Dissertation, Massachusetts Institute of Technology, Jan. 1976.
Muller-Lorenz and Grabke, Coking by metal dusting of steels, 1999, Materials and Corrosion 50, 614-621 (1999).
Nasibulin, Albert G., et al., "An essential role of $CO_2$ and $H_2O$ during single-walled CNT synthesis from carbon monoxide," Chemical Physics Letters 417 (2005) 179-184.
Nasibulin, Albert G., et al., "Correlation between catalyst particle and single-walled carbon nanotube diameters," Carbon 43 (2005) 2251-2257.
Noordin, Mohamad and Kong Yong Liew, "Synthesis of Alumina Nanofibers and Composites," in Nanofibers, pp. 405-418 (Ashok Kumar, ed., 2010) ISBN 978-953-7619-86-2 (available at http://www.intechopen.com/books/nanofibers/synthesis-of-alumina-nanofibers-and-composites).
International Preliminary Report on Patentability, for international Application No. PCT/US2013/000075, dated Oct. 21, 2014, 7 pages.
PCT International Search Report and Written Opinion, PCT/US2013/000075, dated Jun. 26, 2013.
Pender, Mark J., et al., "Molecular and polymeric precursors to boron carbide nanofibers, nanocylinders, and nanoporous ceramics," Pure Appl. Chem., vol. 75, No. 9, pp. 1287-1294, 2003.
Ruckenstein, E. and H.Y. Wang, "Carbon Deposition and Catalytic Deactivation during $CO_2$ Reforming of $CH_4$ over Co/?-Al2O3 Catalysts," Journal of Catalysis, vol. 205, Issue 2, Jan. 25, 2002, pp. 289-293.
Sacco, Albert Jr., "An Investigation of the Reactions of Carbon Dioxide, Carbon Monoxide, Methane, Hydrogen, and Water over Iron, Iron Carbides, and Iron Oxides," PhD Dissertation, Massachusetts Institute of Technology, Jul. 1977, pp. 2, 15-234.
SAE 820875 Utilization of Ruthenium and Ruthenium-Iron Alloys as Bosch Process Catalysts. Jul. 19-21, 1982.
SAE 911451 Optimization of Bosch Reaction, Jul. 15-18, 1991.
Singh, Jasprit, Semiconductor Devices, An Introduction, 1994, pp. 86-93, 253-269.
Singh, Jasprit, Semiconductor Devices, Basic Principles, Chapter 6, Semiconductor Junctions with Metals and Insulators, 2001, pp. 224-244, Wiley.
Skulason, Egill, Metallic and Semiconducting Properties of Carbon Nanotubes, Modern Physics, Nov. 2005, slide presentation, 21 slides, available at https://notendur.hi.is/egillsk/stuff/annad/Egiii.Slides2.pdf, last visited Apr. 28, 2014.
Songsasen, Apisit and Paranchai Pairgreethaves, "Preparation of Carbon Nanotubes by Nickel Catalyzed Decomposition of Liquefied Petroleum Gas (LPG)," Kasetsart J. (Nat. Sci.) 35 : 354-359 (2001) (available at: http://kasetsartjournal.ku.ac.th/kuj_files/2008/A0804251023348734.pdf).
Srivastava, A. K., et al. "Microstructural features and mechanical properties of carbon nanotubes reinforced aluminum-based metal matrix composites." Indian Journal of Engineering and Materials Sciences 15.3 (2008): 247-255.
Szakalos, P., "Mechanisms and driving forces of metal dusting," Materials and Corrosion, 2003, 54, No. 10, pp. 752-762.
XP-002719593 Thomson abstract, Database WPI Week 198920 Thomson Scientific, London, GB; AN 1989-148422 XP002719593, & JP H01 92425 A (Nippon Kokan KK) Apr. 11, 1989 (Apr. 11, 1989), one page.
Tsai, Heng-Yi, et al., "A feasibility study of preparing carbon nanotubes by using a metal dusting process," Diamond & Related Materials 18 (2009) 324-327, Elsevier.
Tse, Anthony N., Si-Au Schottky Barrier Nuclear Battery, A Thesis submitted to the Faculty in partial fulfillment of the requirement for the degree of Doctor of Engineering, Thayer School of Engineering, Dartmouth College, Hanover, New Hampshire, Nov. 1972, pp. 31-57.
Unknown author, "Metal Dusting," unknown publisher, undated.
Unknown author, "Metal Dusting of reducing gas furnace HK40 tube," unknown publisher, undated.
Wei, et al. "The mass production of carbon nanotubes using a nano-agglomerate fluidized bed reactor: A multiscale space-time analysis," Powder Technology 183 (2008) 10-20, Elsevier.
Wiegand et al., Fabrication of High Strength Metal-Carbon Nanotube Composites, U.S. Army Research and Development, Picatinny,

(56) References Cited

OTHER PUBLICATIONS

New Jersey, and New Jersey Institute of Technology, Newark, New Jersey, report date Dec. 2008, 6 pages.

Notice of First Office Action of Chinese Application No. 201380046917.9 dated Nov. 27, 2015.

Notice of Second Office Action of Chinese Application No. 201380046917.9 dated Sep. 27, 2016.

Notice of Third Office Action of Chinese Application No. 201380046917.9 dated Mar. 14, 2017.

First Chinese Search Report, Chinese Application No. 201380046917.9, dated Nov. 18, 2015, 2 pages.

Second Chinese Search Report, Chinese Application No. 201380046917.9, dated Aug. 8, 2016, 1 page.

Third Chinese Search Report, Chinese Application No. 201380046917.9, dated Mar. 6, 2017, 1 page.

* cited by examiner

SOLID CARBON PRODUCTS COMPRISING CARBON NANOTUBES AND METHODS OF FORMING SAME

CROSS-REFERENCE TO RELATED APPLICATIONS

This application is a continuation-in-part of U.S. patent application Ser. No. 15/470,587, filed Mar. 27, 2017, which is a divisional of U.S. patent application Ser. No. 14/414,232, filed Jan. 12, 2015, now U.S. Pat. No. 9,604,848, issued Mar. 28, 2017, which is a national phase entry under 35 U.S.C. § 371 of International Patent Application PCT/US2013/049719, filed Jul. 9, 2013, designating the United States of America and published in English as International Patent Publication WO 2014/011631 A1 on Jan. 16, 2014, which claims the benefit under Article 8 of the Patent Cooperation Treaty to U.S. Provisional Patent Application Ser. No. 61/671,022, filed Jul. 12, 2012, for "Solid Carbon Products Comprising Carbon Nanotubes and Methods of Forming Same," the disclosure of each of which is hereby incorporated herein in its entirety by this reference.

TECHNICAL FIELD

Embodiments of the disclosure relate to methods and systems for forming solid carbon products from carbon nanotubes including mixtures of various types of carbon nanotubes and mixtures of carbon nanotubes with other substances.

BACKGROUND

The following documents, each published in the name of Dallas B. Noyes, disclose background information hereto, and each is hereby incorporated herein in its entirety by this reference:
1. U.S. Patent Publication No. 2012/0034150 A1, published Feb. 9, 2012;
2. International Application No. PCT/US2013/000071, filed Mar. 15, 2013;
3. International Application No. PCT/US2013/000072, filed Mar. 15, 2013;
4. International Application No. PCT/US2013/000073, filed Mar. 15, 2013;
5. International Application No. PCT/US2013/000075, filed Mar. 15, 2013;
6. International Application No. PCT/US2013/000076, filed Mar. 15, 2013;
7. International Application No. PCT/US2013/000077, filed Mar. 15, 2013,
8. International Application No. PCT/US2013/000078, filed Mar. 15, 2013;
9. International Application No. PCT/US2013/000079, filed Mar. 15, 2013; and
10. International Application No. PCT/US2013/000081, filed Mar. 15, 2013.

Conventional methods of using CNTs ("carbon nanotubes") or carbon nanofibers in engineering materials generally rely on embedding the CNTs or carbon nanofibers in a matrix material. CNTs are currently processed in a wide variety of composite structures using metals, plastics, thermoset resins, epoxies, and other substances as the matrix to hold the CNTs together, thus creating solid objects. The CNTs act as reinforcing material to improve properties of the materials. Typical objectives of using carbon nanotubes in a matrix are to increase the strength, decrease weight, or to increase electrical and thermal conductivity of the composite.

Methods to make materials composed primarily of carbon nanotubes include spinning the carbon nanotubes into fibers and making "buckyrock." U.S. Pat. No. 6,899,945, issued May 31, 2005, and entitled "Entangled single-wall carbon nanotube solid material and methods for making same" discloses a method for making buckyrock. Buckyrock is a three-dimensional, solid block material including an entangled network of single-wall CNTs. Buckyrock is mechanically strong, tough, and impact resistant with a bulk density of about 0.72 g/cm$^3$ (see Example 3 of U.S. Pat. No. 6,899,945). The single-wall CNTs in a buckyrock form are present in a random network. The random network of the CNTs appears to be held in place by Van der Waals forces between the CNTs and by physical entanglement or interference of the CNTs. One type of buckyrock is made by forming a slurry of CNTs in water, slowly removing water from the slurry to create a paste, and allowing the paste to dry very slowly, such that the CNT network of the paste is preserved during solvent evaporation. Buckyrock can be used in various applications requiring lightweight material with mechanical strength, toughness, and impact resistance, such as ballistic protection systems.

Though conventional materials including CNTs have interesting and useful properties, the individual CNTs comprising these materials have significantly different properties. It would therefore beneficial to produce materials having properties more comparable to the properties of individual CNTs.

BRIEF SUMMARY

Methods of forming solid carbon products include pressure compaction methods such as extruding, die pressing, roller pressing, injection molding etc. to form solid shapes comprising a plurality of carbon nanotubes. The carbon nanotubes may optionally be mixed with other substances. Such solid shapes may be further processed by heating in an inert atmosphere to temperatures sufficient to sinter at least some of the CNTs so that covalent bonds form between adjacent CNTs. The methods may include forming a plurality of nanotubes, disposing the plurality of nanotubes in a press, and applying heat and pressure to the plurality of carbon nanotubes to form the solid carbon product. When sintered, the resulting material is a novel composition of matter having two or more CNTs with covalent bonding between them.

The solid carbon products, whether sintered or not, include interlocked CNTs that define a plurality of voids throughout the material. The dimension of the interstitial voids may be controlled by a variety of methods including controlling the characteristic diameter of the CNTs comprising the solid carbon products, the inclusion of other materials that may create voids when removed from the solid carbon products, and the pressure and temperatures at which the solid carbon products are formed.

Sintered solid carbon products include a plurality of covalently bonded carbon nanotubes. In some embodiments, the sintered solid carbon products further include amorphous carbon covalently bonded to other carbon atoms, which may be amorphous carbon or crystalline carbon. Some methods include compressing a material comprising carbon nanotubes, heating the compressed material in a non-reactive environment to form chemical bonds between adjacent carbon nanotubes and form a bonded carbon nanotube structure, and cooling the bonded carbon nanotube structure to a temperature at which carbon of the carbon nanotubes does not react with oxygen.

Other methods include first forming a solid carbon product by compressing a material comprising carbon nanotubes and subsequently placing the resulting solid carbon product into sintering conditions. The sintering conditions may include an inert environment, such as a vacuum or inert atmosphere (e.g., argon or helium). The solid carbon product is heated to a desired temperature for a period of time to induce covalent bonding between adjacent CNTs, after which the object is cooled below the oxidation temperature of carbon in air. The product may then be removed from the sintering conditions.

Such methods may include any of a variety of standard industrial processing methods such as extrusion, die pressing, injection molding, isostatic pressing, and roll pressing. The sintering of the solid carbon products can be performed in a variety of apparatus such as are commonly used in sintered powder metallurgy and sintered ceramic processing. The sintering of the solid carbon products may include any of a variety of means including induction heating, plasma arc discharge, high temperature autoclaves and annealing furnaces, and other related devices and methods as are known in the art.

DETAILED DESCRIPTION

Figure 1:
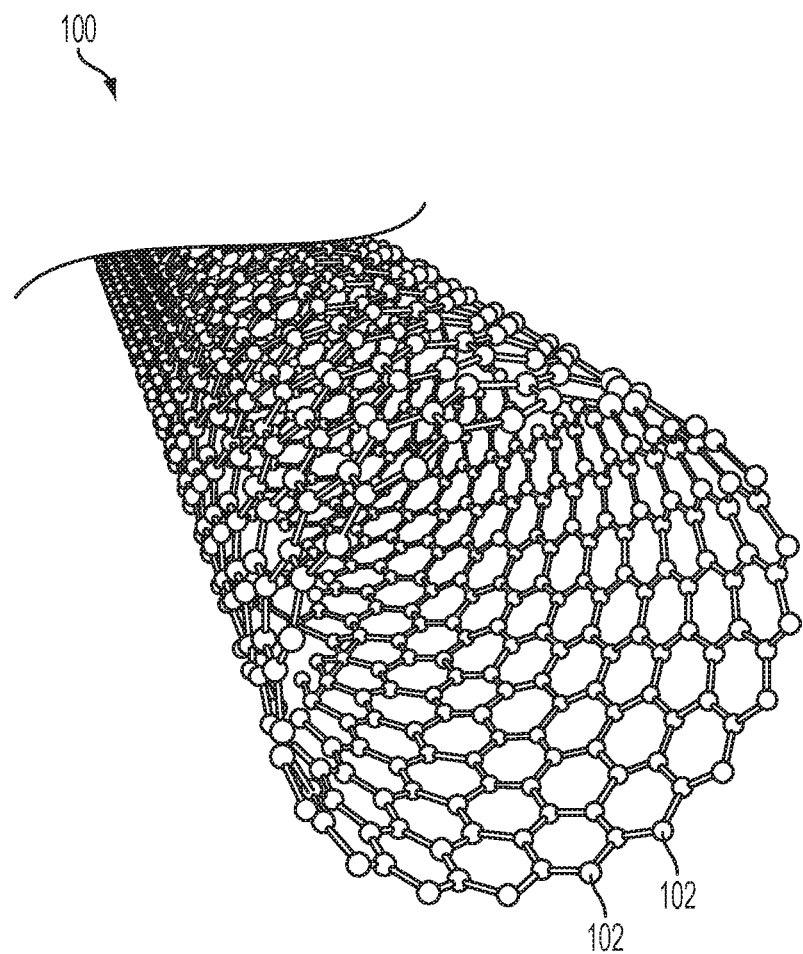
FIGS. 1 through 4 are simplified illustrations of carbon nanotubes.

This disclosure includes methods of forming solid carbon products by applying heat and/or pressure to carbon nanotubes, carbon nanofibers, or both. As used herein, the term "solid carbon products" means and includes any material that comprises carbon and may include any material comprising at least one of one or more of carbon nanotubes and one or more carbon nanofibers. Solid carbon products may be useful in various applications, such as filters, reactors, electrical components (e.g., electrodes, wires, batteries), structures (e.g., beams, frames, pipes), fasteners, molded parts (e.g., gears, bushings, pistons, turbines, turbine blades, engine blocks), etc. Such solid carbon products may exhibit enhanced properties (e.g., strength, electrical or thermal conductivity, specific surface area, porosity, etc.) with respect to conventional materials. This disclosure includes a new class of materials that contain a plurality of CNTs, a plurality of carbon nanofibers, or a combination thereof formed into solid shapes under pressure. When such solid shapes are sintered, covalent bonds form between at least some of the CNTs, the carbon nanofibers, or both forming solid shapes. This material has numerous useful properties.

In other embodiments, solid carbon products may be formed by additive manufacturing. The solid carbon products may be formed to include carbon-carbon covalent bonds between at least some adjacent CNTs and/or carbon nanofibers between at least some of their contact points. In some embodiments, at least some of the carbon of the solid carbon products include amorphous carbon.

As used herein, the term "sintering" means and includes annealing or pyrolyzing solid carbon products (e.g., CNTs and/or carbon nanofibers) at temperatures and pressures sufficient to induce carbon-carbon covalent bonding between at least some of the adjacent CNTs and/or carbon nanofibers between at least some of their contact points.

As used herein, the term "catalyst residual" means and includes any non-carbon elements associated with a CNT and/or a carbon nanofiber. Such non-carbon elements may include a nanoparticle of a metal catalyst in the growth tip of CNTs, and metal atoms or groups of atoms randomly or otherwise distributed throughout and on the surfaces of CNTs and/or carbon nanofibers.

As used herein, the term "green" means and includes any solid carbon product that has not been sintered.

CNTs may be created through any method known to the art, including arc discharge, laser ablation, hydrocarbon pyrolysis, the Boudouard reaction, the Bosch reaction and related carbon oxide reduction reactions, or wet chemistry methods (e.g., the Diels-Alder reaction). The methods described herein are applicable to carbon nanotubes regardless of the method of manufacture or synthesis. Carbon nanofibers may be formed through any method known in the art, including deposition from carbon vapor, such as by catalytic chemical vapor deposition (CCVD) wherein carbon is deposited in the presence of a transition metal catalyst on a substrate, or other method of forming carbon nanofibers known in the art.

CNTs may occur as single-wall and multi-wall carbon nanotubes of various diameters ranging from a few nanometers to 100 nanometers in diameter or more. CNTs may have a wide variety of lengths and morphologies, and may occur as substantially parallel "forests," randomly tangled masses, or "pillows" of structured agglomerations. CNTs may also form or be compounded to form many different mixtures of CNTs with various combinations and distribution of the above characteristics (number of walls, diameters, lengths, morphology, orientation, etc.). Various mixtures, when compounded and used to form the solid carbon products described herein, may result in products with specifically engineered properties. For example, the median void size of interstitial spaces between CNTs comprising solid carbon products typically is approximately proportional to the characteristic diameters of the CNTs used in forming the solid carbon products. The median void size influences the overall porosity and density of the solid carbon products.

Various CNT features and configurations are illustrated in FIGS. 1 through 4. FIG. 1 shows a single-walled CNT 100, in which carbon atoms 102 are linked together in the shape of a single cylinder. The carbon atoms 102 are covalently bonded into a hexagonal lattice, and thus form a CNT 100 that appears as a single graphitic layer rolled into the form of a tube. The CNT 100 may be conceptualized as a "rolled graphene sheet" lattice pattern oriented so that the carbon atoms 102 spiral at various angles with regard to the axis of the CNT 100. The angle is called the "chirality" and common named forms include armchair and zigzag, as described in Mildred S. Dresselhaus & Phaedon Avouris, "Introduction to Carbon Materials Research, in Carbon Nanotubes: Synthesis, Structure, Properties, and Applications," 1, 6 (Mildred S. Dresselhaus, Gene Dresselhaus, & Phaedon Avouris, eds., 2001), the entire contents of which are incorporated herein by this reference. Many chiralities are possible; CNTs 100 with different chiralities may exhibit different properties (e.g., CNTs 100 may have either semiconductor or metallic electrical properties).

The CNT 100 has an inside diameter related to the number of carbon atoms 102 in a circumferential cross section. The CNT 100 depicted in FIG. 1 has a zigzag pattern, as shown at the end of the CNT 100. The diameter may also affect properties of the CNT 100. Single-walled CNTs 100 can have many different diameters, such as from approximately 1.0 nm (nanometer) to 10 nm or more. A CNT 100 may have a length from about 10 nm to about 1 μm (micron), such as from about 20 nm to about 500 nm or from about 50 nm to about 100 nm. CNTs 100 typically have an aspect ratio (i.e., a ratio of the length of the CNT to the diameter of the CNT) of about 100:1 to 1000:1 or greater.

Figure 2:
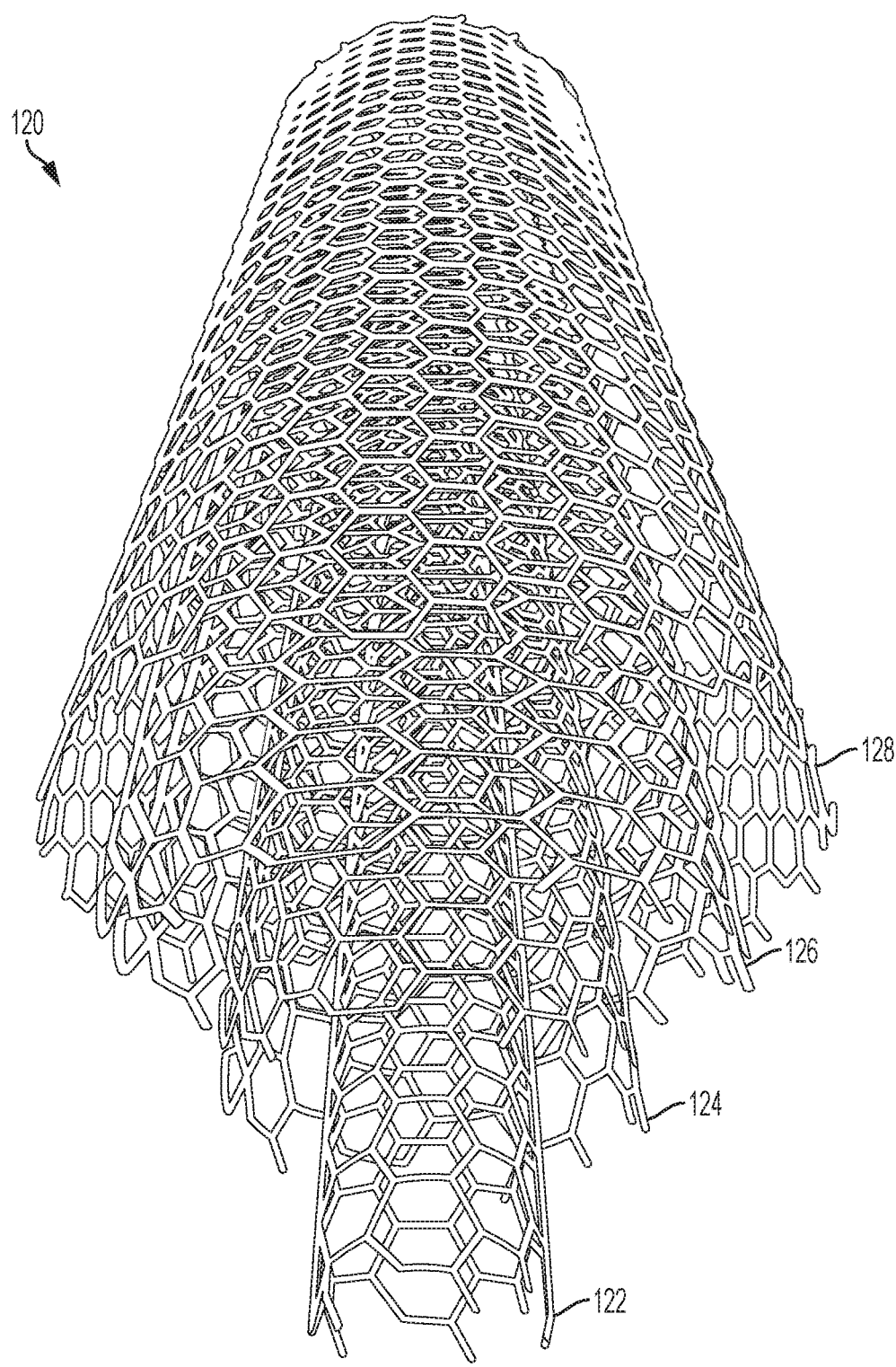

CNTs having more than one wall are called multi-walled CNTs. FIG. 2 schematically depicts a multi-walled CNT 120 having multiple graphitic layers 122, 124, 126, 128 arranged generally concentrically about a common axis. Double-walled and triple-walled carbon nanotubes are occasionally described as distinct classes; however, they may be considered as the smallest categories of multi-walled CNTs 120. Diameters of multi-walled CNTs 120 can range from approximately 3 nm to well over 100 nm. Multi-walled CNTs 120 having outside diameters of about 40 nm or more are sometimes referred to as carbon nanofibers in the art.

Figure 3:
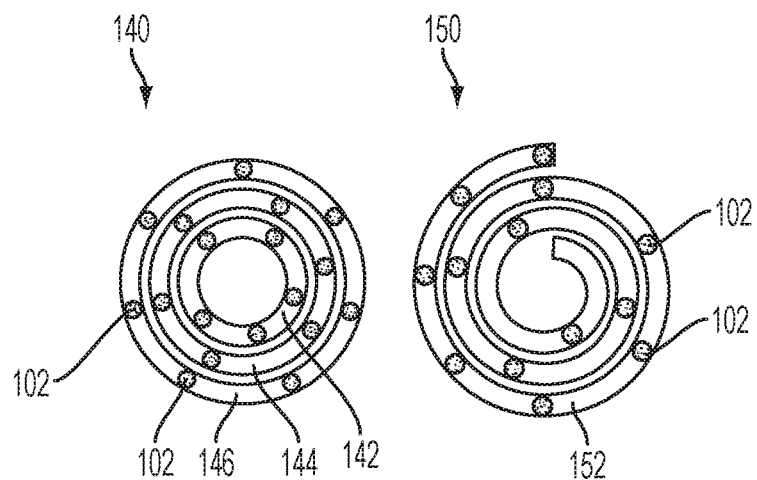

FIG. 3 depicts two forms of multi-walled CNTs 140, 150. In the multi-walled CNT 140, one single-walled CNT 142 is disposed within a larger diameter singe-walled CNT 144, which may in turn be disposed within another even larger diameter single-walled CNT 146. This multi-walled CNT 140 is similar to the multi-walled CNT 120 shown in FIG. 2, but includes three single-walled CNTs 142, 144, 146 instead of four. Another form of multi-walled CNTs shown in FIG. 3 is multi-walled CNT 150, which may be conceptualized as a single graphene sheet 152 rolled into tubes.

Figure 4:
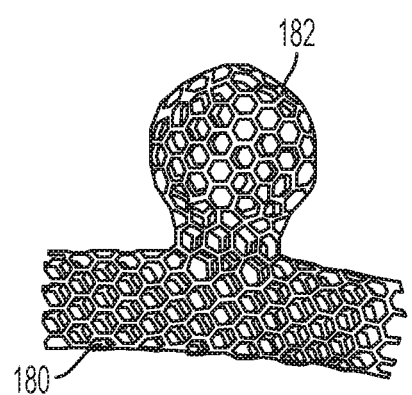

FIG. 4 schematically depicts a single-walled CNT 180 with an attached nanobud 182. The nanobud 182 has a structure similar to a spherical buckminsterfullerene ("buckyball"), and is bonded to the single-walled CNT 180 by carbon-carbon bonds. As suggested by the structure shown in FIG. 4, modifications may be made to the wall of a single-walled CNT 180 or to the outer wall of a multi-walled CNT. At the point of bonding between the nanobud 182 and the single-walled CNT 180, carbon double-bonds can break and result in "holes" in the wall of the CNT 180. These holes may affect the mechanical and electrical properties of the single-walled CNT 180. In single-walled CNTs, these holes may introduce a relative weakness when compared to unmodified cylindrical CNTs. In multi-walled CNTs, the outer wall may be affected, but any inner walls likely remain intact.

Carbon nanotubes are typically formed in such a way that a nanoparticle of catalyst is embedded in the growth tip of the carbon nanotube. This catalyst may optionally be removed by mild washing (e.g., by an acid wash). Without being bound to a particular theory, it is believed that if the catalyst is left in place, catalyst atoms become mobilized during the sintering process, and may migrate to the surface or within the pores of the carbon nanotubes. This process may disperse the catalyst atoms randomly, uniformly, or otherwise throughout the solid carbon product mass and may have a significant influence on the properties of the solid carbon product. For example, catalyst material may affect electrical conductivity or the ability to catalyze other chemical reactions.

The catalyst particles may be selected to catalyze other reactions in addition to the formation of solid carbon. Catalyst particles may be any material, such as a transition metal or any compound or alloy thereof. For example, catalyst particles may include nickel, vanadium oxide, palladium, platinum, gold, ruthenium, rhodium, iridium, etc. Because the catalyst particles are attached to or otherwise associated with CNTs, each catalyst particle may be physically separated from other catalyst particles. Thus, the catalyst particles may collectively have a much higher surface area than a bulk material having the same mass of catalyst. Catalyst particles attached to CNTs may therefore be particularly beneficial for decreasing the amount of catalyst material needed to catalyze a reaction and reducing the cost of catalysts. Compressed solid carbon products used as catalysts may, in many applications, benefit from the catalytic activity of both the CNT and the metal catalyst particles embedded in the growth tip of the CNTs.

The CNTs used in the processes herein may be single-walled CNTs, multi-walled CNTs, or combinations thereof, including bi-modally sized combinations of CNTs, mixtures of single-walled and multi-walled CNTs, mixtures of various sizes of single-walled CNTs, mixtures of various sizes of multi-walled CNTs, etc.

Figure 13:
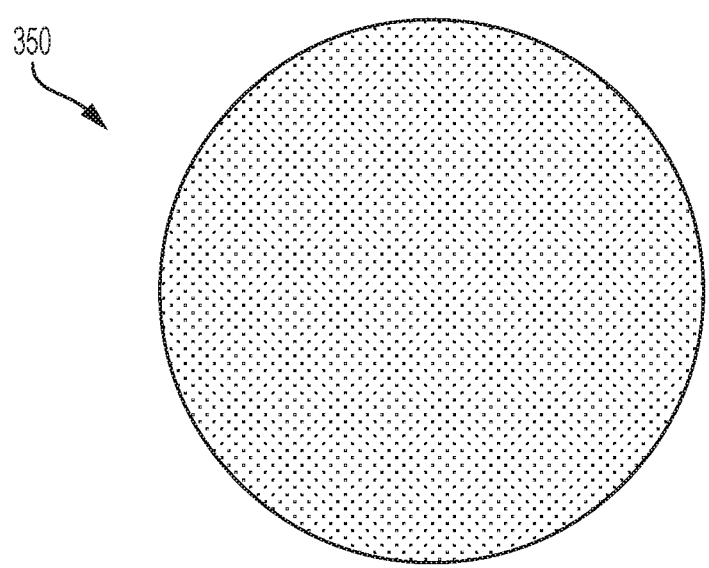
FIG. 13 is simplified illustration of a carbon nanofiber.

FIG. 13 schematically illustrates a carbon nanofiber 350 in accordance with embodiments of the disclosure. As used herein, the term "carbon nanofiber" means and includes a carbon-containing material comprising a solid cylindrical shape substantially free of any voids (e.g., without a hollow central portion). A carbon nanofiber may be similar to a CNT, but may include a solid core rather than a hollow central portion. Carbon nanofibers may exhibit a rod-like shape and may exhibit a greater density than CNTs. In some embodiments, carbon nanofibers may exhibit a greater density than CNTs having the same diameter. Carbon nanofibers may also be in the form of stacked graphene sheets.

The CNTs and the carbon nanofibers may be in forms such as a sheet-molded compound, a pressure-molded compound, or as a pourable liquid. The CNTs and/or the carbon nanofibers may be disposed within a press any other device structured and configured to provide pressure to the material. The press may include an extrusion die, a mold, a cavity, etc. In other embodiments, the CNTs and/or the carbon nanofibers, may be incorporated into a structure comprising the CNTs and/or the carbon nanofibers by additive manufacturing.

Figure 5:
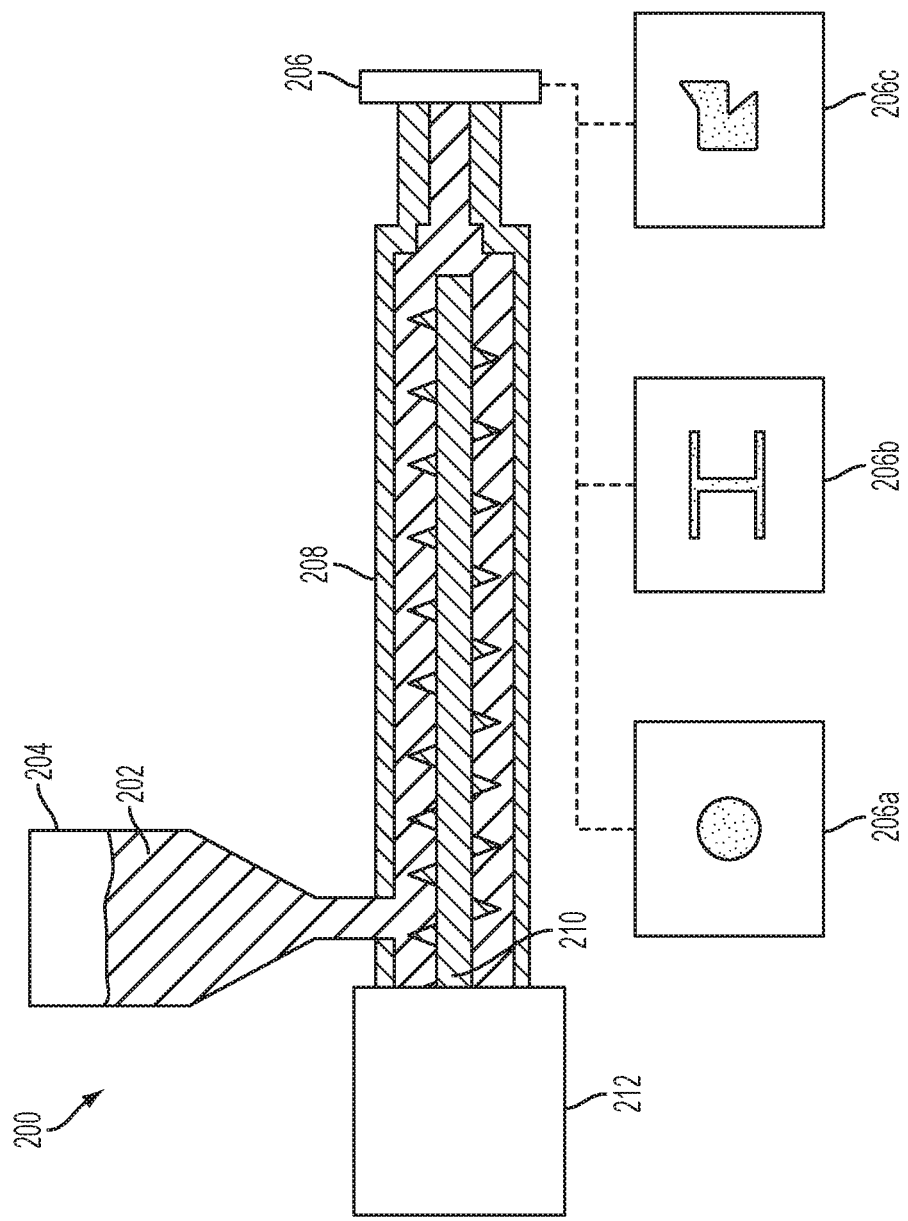
FIGS. 5 through 9 are simplified cross-sectional views of presses for forming solid carbon products.

For example, in the press 200 shown in FIG. 5, a carbon-containing material (e.g., CNTs and/or carbon nanofibers) 202 may be placed in a hopper 204 configured to feed material through an extrusion die 206. The press 200 includes an extrusion barrel 208 with a screw mechanism 210 connected to a drive motor 212 to carry the carbon-containing material 202 through the extrusion barrel 208 to the extrusion die 206. The extrusion barrel 208 may optionally include means for heating the carbon-containing material 202 as the carbon-containing material 202 passes through the extrusion barrel 208. The extrusion die 206 has an opening with a shape corresponding to the cross-sectional shape of a part to be formed in the press 200. Extrusion dies 206 may be interchangeable, depending on the shape of objects desired. Some possible shapes of extrusion dies 206a, 206b, 206c are shown. For example, the extrusion die 206 may have an opening shaped like a circle, a regular polygon, an irregular polygon, an I-beam, etc. Extrusion dies 206 can be structured to create objects of extruded CNTs of a variety of shapes and sizes: symmetrical or asymmetrical, small to large. The carbon-containing material 202 may optionally be mixed with another material before or within the press 200.

Figure 6:
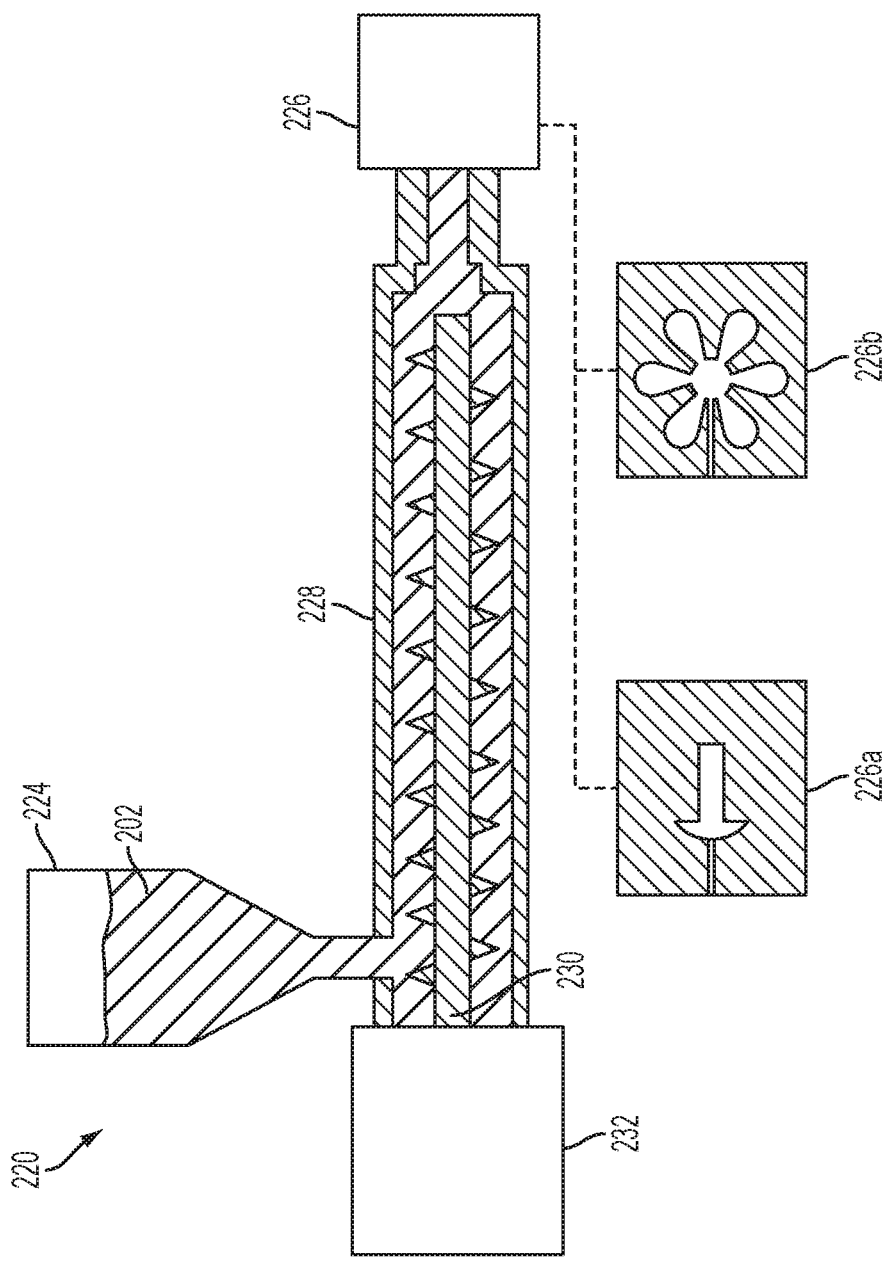

In some embodiments and as shown in the press 220 of FIG. 6, the carbon-containing material 202 is placed into a hopper 224 configured to feed material to a mold 226. The press 220 includes a barrel 228 with a screw mechanism 230 connected to a drive motor 232 to carry the carbon-containing material 202 through the barrel 228 to the mold 226. The barrel 228 may optionally include means for heating the carbon-containing material 202 as the carbon-containing material 202 passes through the barrel 228. The mold 226 has an opening with an interior shape corresponding to the exterior shape of a part to be formed in the press 220. Molds 226 may be interchangeable, depending on the shape of objects desired. Some possible shapes of molds 226a and 226b are shown. For example, the mold 226 may have a shape of a screw or a propeller. The carbon-containing material 202 may optionally be mixed with another material before or within the press 200 to improve flowability, mold release, or other process properties. Such materials may be subsequently removed by suitable means such as etching, pyrolysis, evaporation, etc. The resulting solid carbon product may substantially free of the additional material, and may include essentially carbon and, in some embodiments, residual catalyst material.

Figure 7:
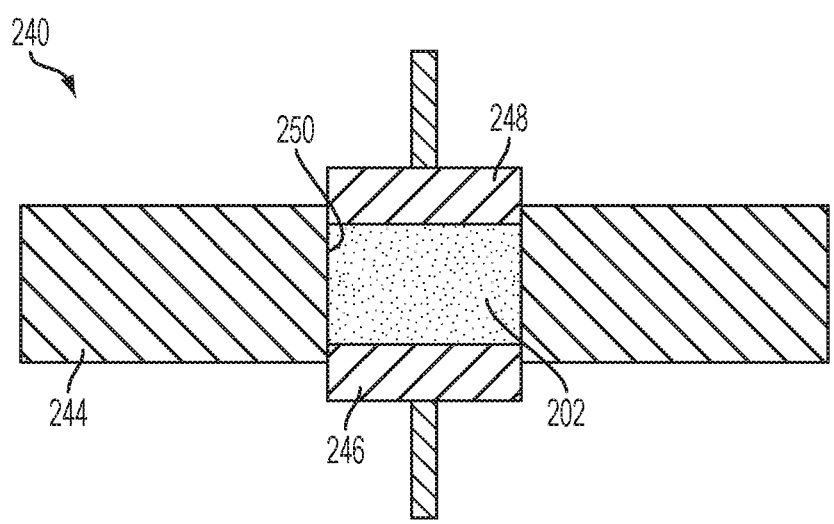

In other embodiments and as shown in the press 240 of FIG. 7, the carbon-containing material 202 is placed into a body 244 having an interior shape defining an exterior of a product to be formed. The carbon-containing material 202 may be placed between two pistons 246, 248 surrounded by the body 244. The body 244 may have walls 250 defining an interior cavity and configured to allow the pistons 246, 248 to slide freely. In other embodiments, a single piston may be configured to press carbon-containing material against a body.

Figure 8:
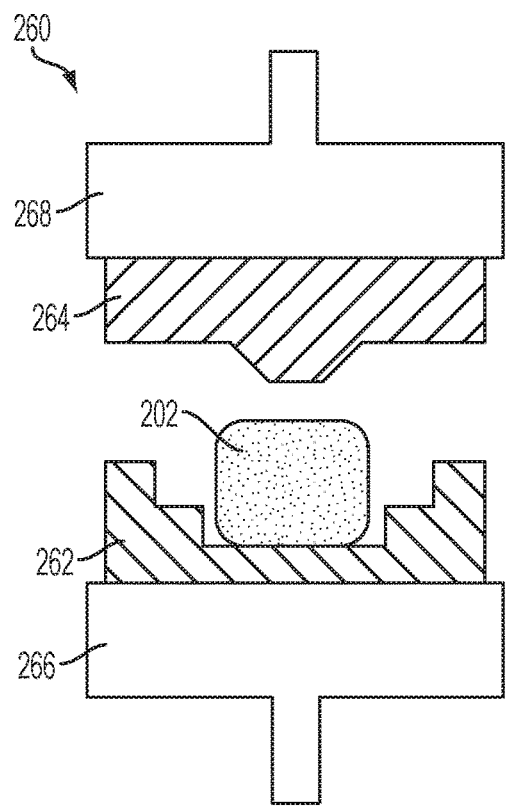
Figure 9:
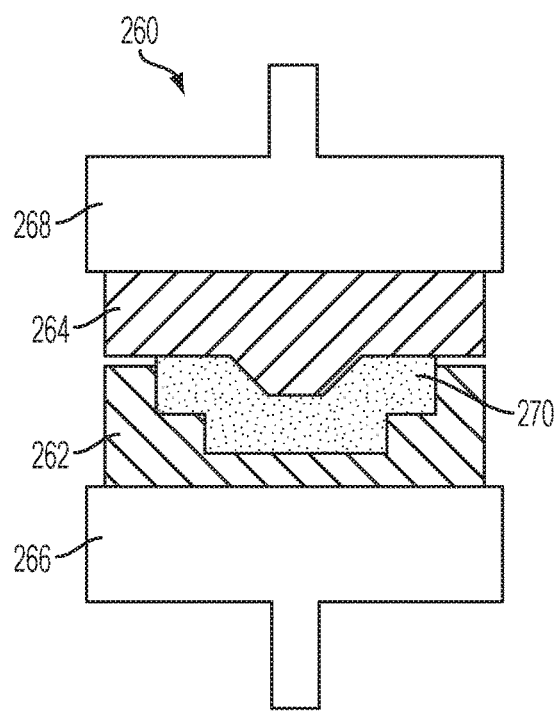

In an embodiment as shown in the press 260 of FIG. 8, the carbon-containing material 202 is placed within a mold portion 262 having one or more surfaces corresponding to a shape of a product to be formed. One or more additional mold portions 264 are configured to press the carbon-containing material 202 against the mold portion 262, when pressed by pistons 266, 268, as shown in FIG. 9. Together, the mold portions 262, 264 define the shape of the product to be formed.

Pressure is applied to form the carbon-containing material into a cohesive "green" body. For example, the screw mechanisms 210, 230 shown in FIGS. 5 and 6 apply pressure to the carbon-containing material 202 as the carbon-containing material 202 passes through the presses 200, 220. Extrusion through a die 206 as shown in FIG. 5 may be continuous (theoretically producing an infinitely long product) or semi-continuous (producing many pieces). Examples of extruded material include wire, tubing, structural shapes, etc. Molding, as in the press 220 shown in FIG. 6, is the process of manufacturing by shaping pliable raw material (e.g., the carbon-containing material 202) using a rigid pattern (the mold 226). The carbon-containing material 202 may adopt the shape of the mold.

The pistons 266, 268 shown in FIGS. 8 and 9 are pressed toward the carbon-containing material 202, forming the carbon-containing material 202 into a green body 270. The resulting green body 270 formed may be held together by relatively weak forces, such that the green body 270 may easily be further shaped (e.g., machined, drilled, etc.), but still holds its shape when handled. Each CNT and/or carbon nanofiber of the carbon-containing material of the green body 270 may each be in physical contact with one or more other CNTs and/or carbon nanofibers.

Heat is applied to green bodies to link the carbon-containing material together into a more cohesive body in which at least some of the adjacent CNTs and/or carbon nanofibers form covalent bonds between other CNTs and/or carbon nanofibers. For example, the carbon-containing material may be heated at a heating rate from about 1° C./min to about 50° C./min to a temperature of at least 1500° C., 1800° C., 2100° C., 2400° C., 2500° C., 2700° C. or even to just below the sublimation temperature of carbon (approximately 3600° C.). Pressure may also be applied concurrently with, before, or after heat is applied. For example, the carbon-containing material may be pressed at 10 to 1000 MPa, such as 30 MPa, 60 MPa, 250 MPa, 500 MPa, or 750 MPa. The green bodies may be subjected to a heated inert environment, such as helium or argon, in an annealing furnace. Sintering the carbon-containing material (i.e., subjecting CNTs and/or carbon nanofibers to heat in an oxygen-free environment) apparently creates covalent bonds between the CNTs and/or carbon nanofibers at points of contact. The sintering of the carbon-containing material typically occurs in a non-oxidizing environment, such as a vacuum or inert atmosphere so that the CNTs and/or carbon nanofibers are not oxidized during the sintering. Sintering the carbon-containing material to induce chemical bonding at the contact surfaces may improve desirable material properties such as strength, toughness, impact resistance, electrical conductivity, or thermal conductivity in the solid structure product when compared to the green material. The carbon-containing material may also be sintered in the presence of additional constituents such as metals or ceramics to form composite structures, lubricants to aid processing, or binders (e.g., water, ethanol, polyvinyl alcohol, coal, tar pitch etc.). Materials may be introduced as powders, shavings, liquids, etc. Suitable metals may include, for example, iron, aluminum, titanium, antimony, Babbitt metals, etc. Suitable ceramics may include materials such as oxides (e.g., alumina, beryllia, ceria, zirconia, etc.), carbides, boride, nitrides, silicides, etc. In embodiments in which materials other than CNTs and/or carbon nanotubes are present, covalent bonding occurs between at least some of the CNTs and/or carbon nanofibers, and the additional materials may become locked into a matrix of CNTs and/or carbon nanofibers.

The carbon-containing material in the sintered body may comprise chemical bonds connecting CNTs and/or carbon nanofibers with each other. Chemical bonds, which are generally stronger than physical bonds, impart different properties on the collection of the carbon-containing material than physical bonds. That is, the sintered body may have higher strength, thermal conductivity, electrical conductivity, or other properties than the green body from which it was formed.

When single-walled CNTs are covalently bonded to adjacent single-wallws CNTs, holes can form on the surface of the CNTs as some of the carbon-carbon bonds break, thus modifying the mechanical and electrical properties of each single-walled CNT. Sintered single-walled CNTs, however, may still typically exceed non-sintered single-walled CNTs in such properties as strength, toughness, impact resistance, electrical conductivity, and thermal conductivity. With multi-walled CNTs, typically only the wall of the outer tube is modified; the internal walls remain intact. Thus, using multi-walled and bi-modally sized CNTs in, for example, extrusion and molding processes, may yield solid structures with properties that, in many respects, exceed practical limitations of single-walled CNTs. Similarly, using carbon nanofibers in, for example, extrusion and molding processes, may yield solid carbon products with properties that, in many respects, exceed practical limitations of carbon nanofiber bound together, such as in a tow or carbon nanofibers.

Sintering appears to cause covalent bonds to form between the walls of CNTs at their contact points and between outer surfaces of carbon nanofibers at their contact points. That is, any given CNT or carbon nanofiber may "cross-link" with an adjacent CNT or carbon nanofiber at the physical point of contact of the two structures. Any given CNT or carbon nanofiber having undergone sintering may be covalently bound to numerous other CNTs (both single-walled CNTs and multi-walled CNTs) and/or carbon nanofibers. This increases the strength of the resulting structure because the CNTs and/or carbon nanofibers do not slide or slip at the bonding points. Unsintered, CNTs (e.g., in buckyrock) and/or carbon nanofibers may slide with respect to each other. Because the covalent bonding caused by sintering may occur at numerous sites in the mass of CNTs and/or carbon nanofibers, the sintered body has significantly increased strength, toughness, impact resistance, and conductivity over convention agglomerations of CNTs and/or carbon nanofibers.

Figure 10:
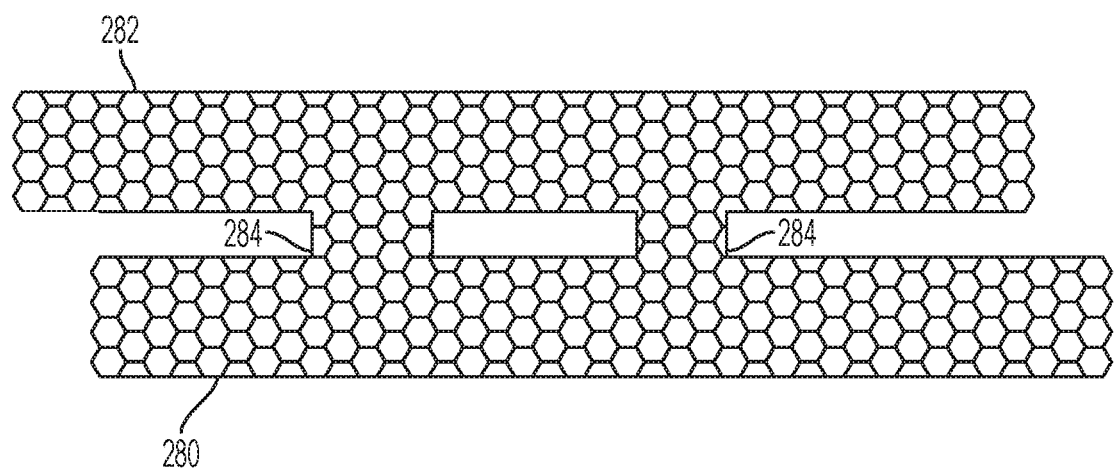
FIGS. 10 and 11 are simplified illustrations depicting the structures of linked carbon nanotubes.

FIG. 10 schematically depicts the cross-linked structure of two covalently bound carbon-containing structures 280, 282 (e.g., CNTs and/or carbon nanofibers) produced by sintering. When sintered, the carbon-containing structures 280, 282 covalently bond at their contact points 284. Each carbon-containing structure may form covalent bonds with some or all of the other carbon-containing structures with which it is in contact during sintering. In some embodiments, the covalent bonds are formed during sintering of the carbon-containing structures 280, 282 at temperatures greater than about 1,600° C. By way of nonlimiting example, due to the internal layering in a multi-walled CNT, covalent bonding between the individual walls of the multi-walled CNT is likely to occur under sintering conditions. The heating and optional pressurization of the carbon-containing structures in a sintering process are maintained until the desired level of cross-linking has occurred. The sintered carbon-containing structures are then cooled to a temperature at which the carbon-containing structures will not spontaneously react with oxygen. Thereafter, the mixture may be exposed to air for further processing, storage, packaging, shipment, sale, etc.

In another embodiment, a mixture comprising one or more CNTs, one or more carbon nanofibers, or both, is heated in a reactive environment (e.g., in the presence of oxygen, hydrogen, a hydrocarbon, and/or another material). In this embodiment, heat and pressure are maintained as needed until the reactants in the reactive environment have reacted with one another or with the CNTs and/or carbon nanofibers. The product is then cooled. In such a process, the reactants may form additional holes or pores in the CNTs and/or carbon nanofibers, increasing the specific surface area of the sintered body. Alternatively, the reactants may deposit materials on the surface of the CNTs and/or carbon nanofibers without affecting the underlying CNT and/or carbon nanofiber structure.

In another embodiment, the mixture comprising one or more CNTs and/or one or more carbon nanofibers is initially heated and sintered in a nonreactive environment (e.g., in a vacuum, in the presence of helium, or in the presence of argon). Subsequent to sintering, the heat and pressure are changed to suitable reaction conditions and reactants are added to the environment. Such reactants may include a variety of metals (as liquid or vapor), metal carbonyls, silanes, or hydrocarbons. The reaction of the reactants with one another or with the carbon of the one or more CNTs and/or one or more carbon nanofibers may fill some or all of the interstices of the solid carbon product lattice (e.g., the CNT lattice) with products of the reactions. Such processing with additional reactants may in some cases be conducted during sintering, but may also be performed separately. The heat and pressure are maintained until the desired level of reaction (both cross-linking within the CNTs and/or carbon nanofibers, and the reaction between the CNTs and/or carbon nanofibers and the reactant) has occurred. The reacted mixture is then cooled and removed from the reaction environment for further processing, storage, packaging, shipment, sale, etc.

Figure 11:
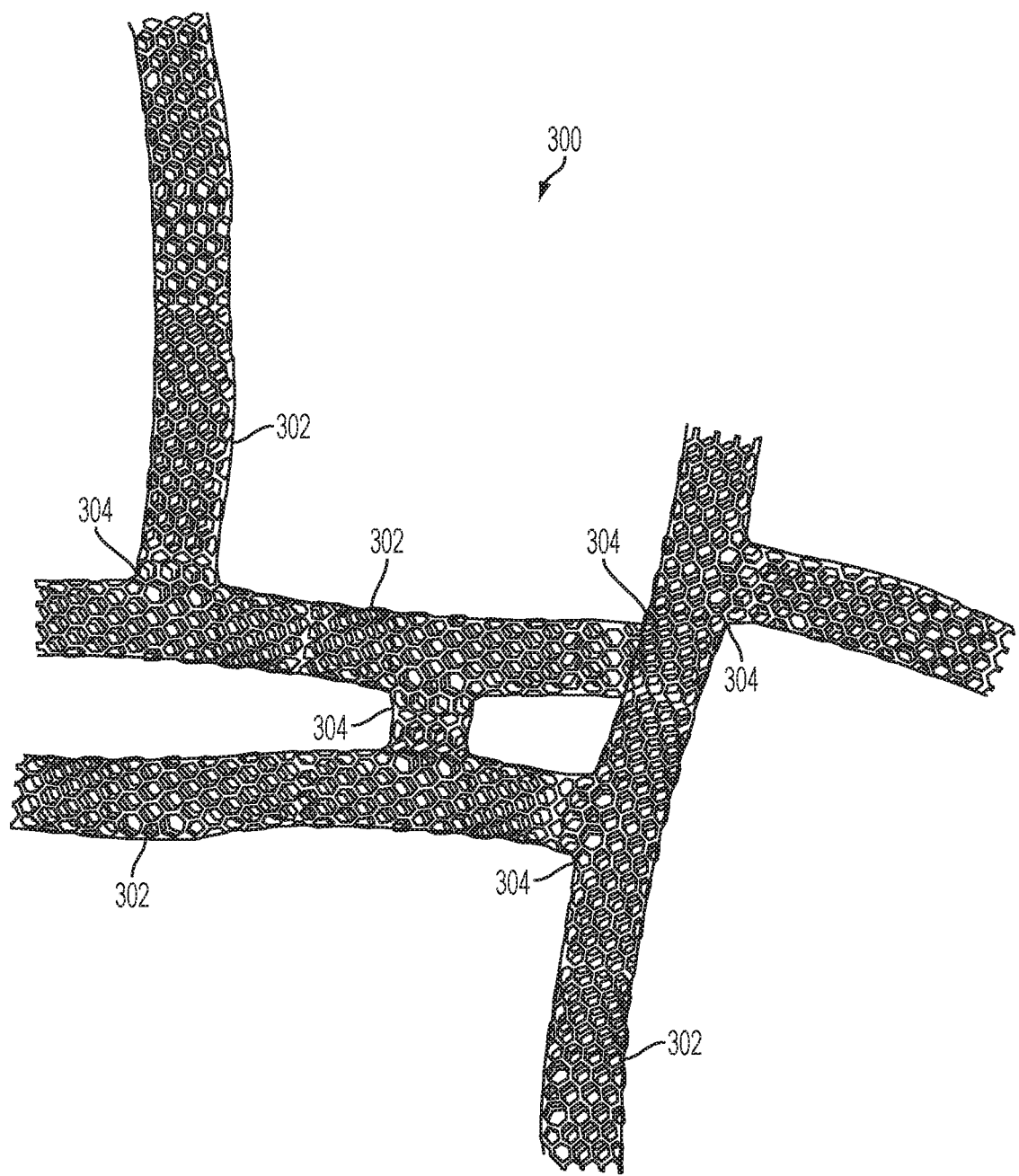

FIG. 11 schematically depicts a mass 300 of covalently bound CNTs 302. The CNTs 302 bind through sintering with other CNTs 302 (multi-walled or single-walled CNTs) through mutual contact points 304, binding the aggregate together into a highly cross-linked structure. The resultant binding may create a material of significant strength, toughness, impact resistance, and electrical and thermal conductivity. Although FIG. 11 has been described as including a mass 300 of covalently bound CNTs 302, the disclosure is not so limited. In other embodiments, the mass 300 may comprise covalently bound carbon nanofibers. In some embodiments, the mass 300 comprises covalently bound carbon nanofibers and covalently bound CNTs. At least some of the CNTs may be covalently bound to other CNTs and to at least some of the carbon nanofibers and at least some of the carbon nanofibers may be covalently bound to at least other carbon nanofibers and to at least some of the CNTs.

During the sintering process, the green body may shrink, corresponding with a decrease in the size of voids among the CNTs and/or carbon nanofibers. However, the sintered body may remain porous due to the porosity of each CNT (i.e., the center of the CNT) and due to voids between and among CNTs and/or carbon nanofibers. The sintered body may have pores or voids having a median minimum dimension of less than about 1 µm, less than about 500 nm, less than about 100 nm, less than about 50 nm, or even less than about 10 nm. That is, each void may have two or more dimensions (e.g., a length, a width, and a height, each perpendicular to the others, or a diameter and a length), measured in different directions. The voids need not be regularly shaped. The "minimum dimension" is defined as the minimum of the two or more dimensions of a single void. The "median minimum dimension" is defined as the median of these minimum dimensions for a group of voids.

A sintered body as described herein may have a high specific surface area, due to voids between CNTs and/or carbon nanofibers and within CNTs (i.e., because the CNTs are hollow). For example, a sintered body may have a specific surface area of at least about 100 $m^2/g$, at least about 500 $m^2/g$, at least about 750 $m^2/g$, at least about 900 $m^2/g$, or even at least about 1000 $m^2/g$. The specific surface area can be controlled by the characteristic diameters or mixture of diameters of the CNTs and/or carbon nanofibers used in forming the solid carbon product. For example, small-diameter single-walled CNTs have specific surface areas up to approximately 3000 $m^2/g$, while large-diameter multi-walled CNTs have specific surface areas of approximately 100 m²/g. In some embodiments, the sintered body may be formed from CNTs having at least one property (e.g., a diameter, a density, a specific surface area, a length, etc.) different than an analogous property of at least some carbon nanofibers used to form the sintered body.

A sintered body may have a high electrical conductivity. For example, a sintered body may have an electrical conductivity of at least about $1 \times 10^5$ S/m (Siemens per meter), at least about $1 \times 10^6$ S/m, at least about $1 \times 10^7$ S/m, or even at least about $1 \times 10^8$ S/m. The electrical conductivity can be controlled by the types of carbon-containing materials (e.g., CNTs and/or carbon nanofibers) used, the chirality of the carbon-containing materials (e.g., CNTs and/or carbon nanofibers) used, the sintering conditions, and the quantity of resulting covalent bonds in the solid carbon product. For example, single-walled CNTs with a metallic chirality have a much higher electrical conductivity than multi-walled CNTs. As a further example, an increase in the number of covalent bonds appears to correlate with an increase in conductivity.

A sintered body may also have a high thermal conductivity. For example, a sintered body may have a thermal conductivity of at least about 400 W/m·K (watts per meter per Kelvin), at least about 1000 W/m·K, at least about 2000 W/m·K, or even at least about 4000 W/m·K. The thermal conductivity of the resulting solid carbon product may be controlled by the types of carbon-containing material (e.g., CNTs and/or carbon nanofibers) used and the chirality of the carbon-containing material (e.g., CNTs and/or carbon nanofibers used). For example, single-walled CNTs with a metallic chirality have much high thermal conductivity than large multi-walled CNTs.

CNTs and/or nanofibers may alternatively be pressed after the sintering process by, for example, extrusion or molding, as described above with respect to FIGS. 5 through 9. In some embodiments, the sintering process may be part of the formation of the desired object. For example, a section of the extrusion barrel may heat the CNTs and/or carbon nanofibers to the sintering temperature in an inert atmosphere for an appropriate amount of time to cause sintering. Such heating may be, for example, induction heating or plasma arc heating. Thus, sintered CNTs and/or sintered carbon nanofibers may be extruded. The sintered CNTs and/or sintered carbon nanofibers may optionally be mixed with another material such as a metal, a ceramic, or glass. The material may be pressed or pulled through a die under either extreme heat or cold. The material, forced into a given shape, is held in place for a period of time and at sintering temperatures and pressures, and then returned to normal atmospheric conditions. The products may be continuous, such as wires, or may be discrete pieces, such as bolts, propellers, gears, etc. Molding of sintered or sintering CNTs and/or carbon nanofibers typically involves either using the CNT material and/or the carbon nanofiber material in concentrated form (i.e., with minimal impurities) or in forming a moldable composite with another material, such as a metal. The moldable material is placed or poured into a rigid mold, held at a particular temperature and pressure, and then cooled back to normal atmospheric conditions.

In some embodiments, an incremental manufacturing method may be employed wherein, CNTs (either compressed or not) and/or carbon nanofibers are placed in a nonreactive environment, such as in an inert gas autoclave. The CNTs and/or carbon nanofibers are sintered to form covalent bonds between the CNTs and/or carbon nanofibers in the surface layer and the underlying layer. For example, a laser may irradiate a portion of the CNTs and/or carbon nanofibers in a pattern. Additional CNTs and/or carbon nanofibers are deposited over the sintered CNTs and/or carbon nanofibers, and in turn sintered. The sintering process is repeated as many times as necessary to achieve a selected thickness of sintered structure comprising CNTs and/or carbon nanofibers. The sintered CNTs and/or carbon nanofibers are then cooled to a temperature below which the CNTs and/or carbon nanofibers do not react with oxygen or other atmospheric gases. The sintered CNTs and/or carbon nanofibers may then be removed from the nonreactive environment without contaminating the sintered CNTs and/or carbon nanofibers. In some embodiments, the sintered CNTs and/or carbon nanofibers are cooled and removed from the nonreactive environment before deposition of each additional portion of CNTs and/or carbon nanofibers.

Figure 14:
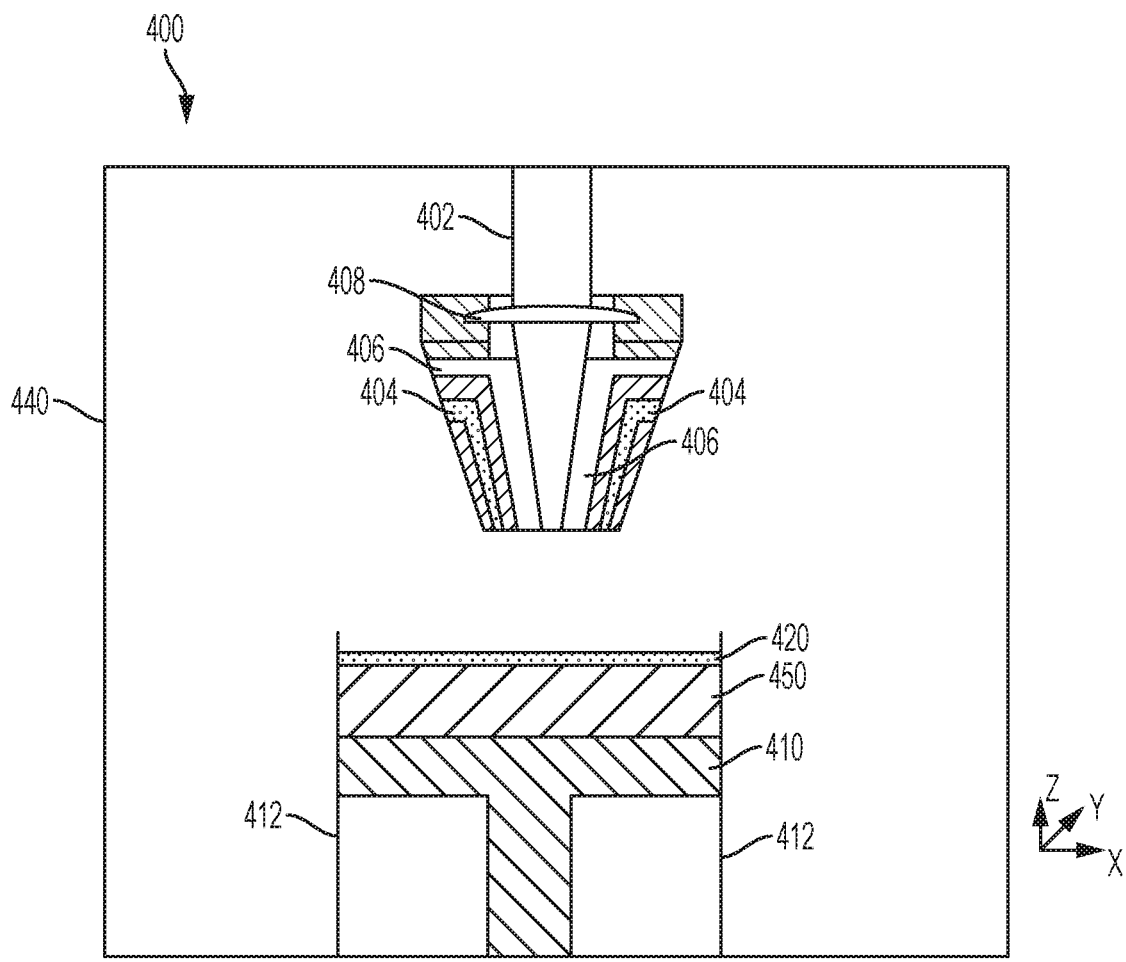
FIG. 14 is a simplified illustration illustrating a tool for additively manufacturing a carbon-containing material.

In some embodiments, a structure comprising CNTs and/or carbon nanofibers may be formed by additive manufacturing, such as by, for example, selective laser sintering (SLS), laser engineered net shaping, or other 3D printing or additive manufacturing process. In some embodiments, the structure may be formed one layer at a time. FIG. 14 is a cross-sectional view of a tool 400 for additively manufacturing a structure 450. The structure 450 may be disposed on a movable stage 410. In some embodiments, the structure 450 is disposed over a substrate on the movable stage 410. The movable stage 410 may comprise a piston configured to move in a vertical direction (e.g., up and down in the cross-sectional view illustrated in FIG. 14). In some such embodiments, the movable stage 410 may be configured to move closer to (e.g., toward) and away from a laser 402. The movable stage 410 may be disposed between sidewall structures 412.

The tool 400 may include one or more powder delivery nozzles 404. The powder delivery nozzles 404 may be configured to provide a powder material over a surface of the structure 450 on the movable stage 410 to form a powder layer 420 thereon. In some embodiments, the powder delivery nozzles 404 may be configured to provide the powder layer 420 to the structure 450 coaxially with the laser radiation from the laser 402. Each of the powder delivery nozzles 404 may be configured to provide a powder material having a different composition than that provided by the other powder delivery nozzles 404. In some embodiments, the powder may be provided from the powder delivery nozzles 404 to the surface of the structure 450 or the substrate by gravity. In other embodiments, the powder may be fed with an inert carrier gas, such as, for example, nitrogen, argon, helium, another inert carrier gas, or combinations thereof. Although FIG. 14 illustrates two powder delivery nozzles 404, the tool 400 may include one powder delivery nozzle 404 or more than two powder delivery nozzles 404 (e.g., three, four, etc.). A shield gas, which may comprise, for example, one or more of the carrier gases (e.g., nitrogen, argon, helium, etc.) configured to shield the powder layer from, for example, oxygen, or to promote layer to layer adhesion, may be provided through one or more shield gas ports 406. Although not shown, the powder delivery nozzles 404 may be operably coupled to a powder source and the shield gas ports 406 may be operably coupled to a shield gas source.

The laser 402 may be configured to direct electromagnetic radiation (e.g., laser radiation) through a lens 408 and to the powder layer 420 over the structure 450. Responsive to exposure to heat provided by the laser radiation, individual particles of the powder layer 420 may form inter-granular bonds with each other and with previously formed layers of the structure 450 previously exposed to the laser radiation.

The lens 408 may comprise a focusing lens and may be positioned to focus laser radiation from the laser 402 a predetermined distance from the laser 402.

The movable stage 410, on which the structure 450 may be disposed, may be configured to move in one or more directions. By way of nonlimiting example, the movable stage 410 may be configured to move in one or more of a z-direction (e.g., up and down in the cross-sectional view of FIG. 14), an x-direction (e.g., left and right in the cross-sectional view of FIG. 14), and a y-direction (e.g., into and out of the plane of the cross-sectional view of FIG. 14). Since the structure 450 is disposed on, or otherwise attached to, the movable stage 410, the structure 450 may be configured to move relative to the laser 402.

In other embodiments, the laser 402 may be configured to move in one or more directions, such as, for example, one or more of the z-direction, the y-direction, and the x-direction. Accordingly, the laser 402 may be configured to move relative to the structure 450 and the movable stage 410.

In use and operation, the powder layer 420 may be formed over an uppermost surface of the structure 450. The powder layer 420 may be exposed to laser radiation from bonds between the powder and the structure 450 (e.g., such as by sintering). Exposing the powder layer 420 to laser radiation may form another layer on the structure 450. As described above, at least one of the laser 402 or the movable stage 410 may be coupled to a suitable drive assembly to move in a horizontal plane (e.g., the x-direction, the y-direction, or both) in a designated pattern and speed to expose selected portions of the powder layer 420 to the laser radiation. After formation of the layer of the structure, the structure 450 may be moved away from the laser 402 (such as by moving the laser 402, moving the movable stage 410, or both) a predetermined distance, which may correspond to a thickness of the previously formed layer of the structure 450. By way of nonlimiting example, the movable stage 410 may be moved away from the laser 402 after forming a layer of the structure 450. Movement of the structure 450 relative to the laser 402 may form a cavity defined by the previously formed layer and the sidewall structures 412. Powder may be deposited within the cavity and over the structure 450 by one or more of the powder delivery nozzles 404 to form another powder layer 420 over the previously formed layer of the structure 450. The powder layer 420 may be compacted and subsequently exposed to laser radiation to form another layer of the structure 450. Accordingly, the structure 450 may be formed layer-by-layer.

In some embodiments, the tool 400 may be substantially enclosed, such as with an enclosure 440. The interior of the enclosure 440 may be substantially free of oxygen or other gases that may oxidize or otherwise react with the powders that form the structure 450 during exposure of the powders to the laser radiation. In some embodiments, the interior of the enclosure 440 includes one or more of the shield gases (e.g., argon). In some embodiments, a concentration of oxygen in the enclosure 440 may be less than about 70 ppm, such as less than about 50 ppm, less than about 40 ppm, less than about 20 ppm, or less than about 10 ppm.

Although the tool 400 has been described as including powder delivery nozzles 404, the disclosure is not so limited. In other embodiments, the tool 400 may include a different powder delivery system. By way of nonlimiting example, the tool 400 may include a powder delivery piston located adjacent the movable stage 410 such as in a selective laser sintering (SLS) tool. The powder delivery piston may be configured to introduce one or more powders to a location coplanar with an uppermost surface of the structure 450. A roller may be configured to roll powder from the powder delivery system to a location on the uppermost surface of the structure 450.

Figure 15:
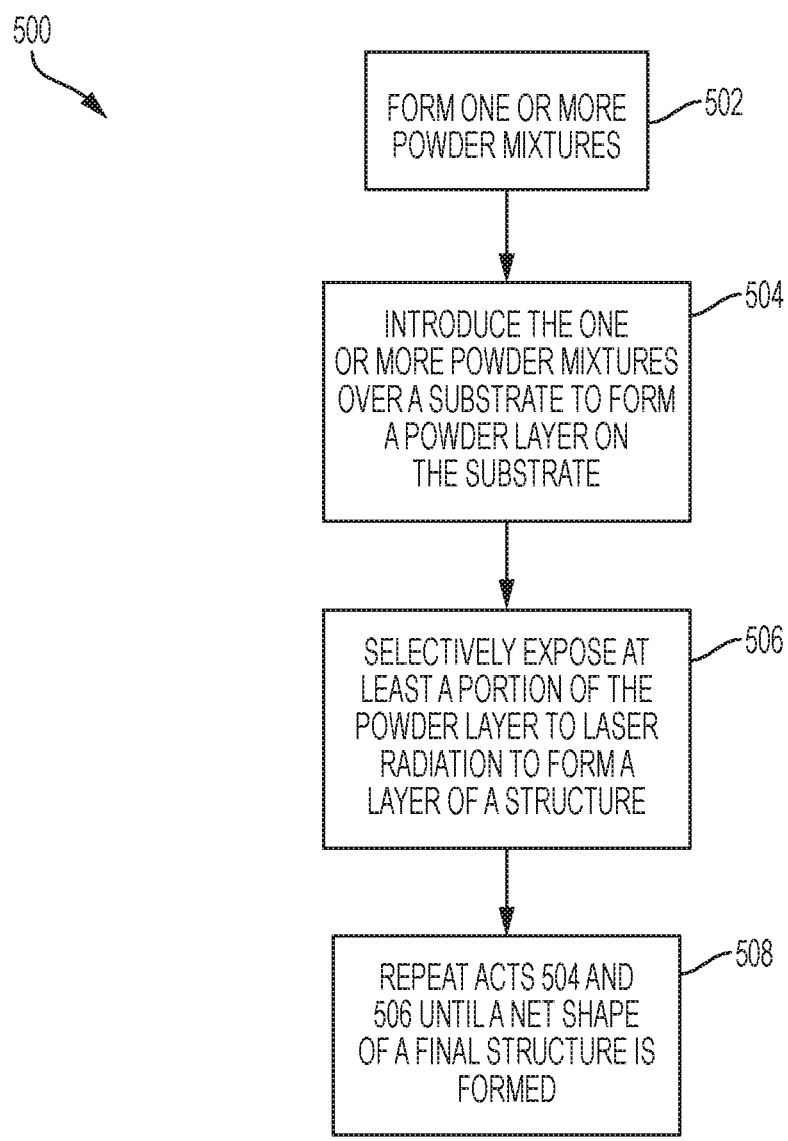
FIG. 15 is a simplified flow diagram illustrating a method of additively manufacturing a carbon-containing material.

FIG. 15 is a simplified flow diagram illustrating a method 500 of forming at least one structure by additive manufacturing, in accordance with embodiments of the disclosure. The method 500 may include act 502 including forming one or more powder mixtures that will be used to additively manufacture a structure; act 504 including introducing the one or more powder mixtures over a substrate to form a powder layer on the substrate; act 506 including selectively exposing at least a portion of the powder layer to laser radiation to form a layer of a structure; and act 508 including repeating cycles of act 504 and act 506 until a net shape of the structure is formed.

Act 502 includes forming one or more mixtures of a powder that will be used to additively manufacture at least one structure. In some embodiments, a first powder material is mixed with at least a second, different powder material to form a powder mixture including particles of the first powder material substantially homogeneously dispersed throughout particles of the second powder material.

The first powder material may comprise CNTs, carbon nanofibers, a combination thereof. By way of nonlimiting example, the powder material may comprise single-walled CNTs and multi-walled CNTs, such as the single-walled and the multi-walled CNTs described above. A diameter of particles of the first powder material may be between about 1 nm and about 100 μm, such as between about 1 nm and about 10 nm, between about 10 nm and about 50 nm, between about 50 nm and about 100 nm, between about 100 nm and about 500 nm, between about 500 nm and about 1 μm, between about 1 μm and about 5 μm, between about 5 μm and about 10 μm, between about 10 μm and about 50 μm, or between about 50 μm and about 100 μm. In some embodiments, the diameter of the particles of the first powder material is between about 1 μm and about 5 μm.

The second powder material may comprise one or more materials that may be incorporated into the structure being formed. In some embodiments, the second powder material comprises at least one material selected from the group consisting of at least one metal, at least one ceramic (e.g., a carbide, a nitride, a silicide, an oxide), and at least one other material. By way of nonlimiting example, the second powder material may comprise one or more of aluminum, silicon, phosphorus, sulfur, titanium, vanadium, chromium, manganese, iron, cobalt, nickel, copper, zinc, zirconium, palladium, silver, cadmium, tin, tantalum, tungsten, platinum, and gold, a ceramic (e.g., a carbide (e.g., aluminum carbide, tungsten carbide, cementite, silicon carbide, titanium carbide, boron carbide, etc.), an oxide (e.g., alumina ($Al_2O_3$), beryllia, ceria, zirconia, etc.) a nitride (e.g., silicon nitride), a silicide (e.g., ferrosilicon ($Fe_5Si_2$), manganese silicide ($MnSi_2$), titanium disilicide ($TiSi_2$), silicon boride ($SiB_4$, $SiB_6$), etc.), borides (such as, for example, aluminum diboride ($AlB_2$), cobalt boride (CoB, $CO_2B$), nickel boride (NiB), tantalum boride (TaB, $TaB_2$), titanium boride ($TiB_2$), tungsten boride (WB), etc.), or combinations thereof.

The first powder material may constitute between about 1 weight percent (1 wt. %) and about 50 weight percent of the powder mixture, such as between about 1 weight percent and about 5 weight percent, between about 5 weight percent and about 10 weight percent, between about 10 weight percent and about 20 weight percent, between about 20 weight percent and about 30 weight percent, between about 30 weight percent and about 40 weight percent, or between about 40 weight percent and about 50 weight percent of the powder mixture.

The second powder material may constitute between about 50 weight percent and about 99 weight percent of the powder mixture, such as between about 50 weight percent and about 60 weight percent, between about 60 weight percent and about 70 weight percent, between about 70 weight percent and about 80 weight percent, between about 80 weight percent and about 90 weight percent, or between about 90 weight percent and about 99 weight percent of the powder mixture.

In some embodiments, particles of the powder mixture may comprise coated particles. One of the first powder material and the second powder material may be coated with the other of the first powder material and the second powder material. By way of nonlimiting example, particles of one or more CNTs and/or carbon nanofibers may be coated with one or more materials of the second powder material (e.g., at least one of one or more of metals and one or more ceramics). In other embodiments, one or more particles of the second powder material may be coated with one or more of CNTs and/or carbon nanofibers. The particles of the powder material may be coated by one or more of atomic layer deposition (ALD), chemical vapor deposition (CVD), or other suitable method. In some such embodiments, forming the one or more powder mixtures may include forming a powder mixture comprising one or more of CNTs and/or carbon nanofibers coated with a second material or a second material coated with one or more of CNTs and/or carbon nanofibers.

Act 504 includes introducing the one or more powder mixtures over a substrate to form a powder layer over the substrate. In some embodiments the first powder material and the second powder material may be disposed over the substrate separately, such as through separate powder delivery nozzles 404 (FIG. 14). In other embodiments, the first powder material and the second powder material may be premixed to a selected composition prior to introducing the powder mixture over the substrate.

Sufficient powder may be provided over the surface of the substrate to form a layer having a thickness between about 10 nm and about 100 μm, such as between about 10 nm and about 50 nm, between about 50 nm and about 100 nm, between about 100 nm and about 500 nm, between about 500 nm and about 1 μm, between about 1 μm and about 5 μm, or between about 5 μm and about 10 μm.

The powder may be provided to the selected locations over the substrate such that a cross-sectional profile of the powder layer exhibits a selected cross-sectional shape and composition of the structure. By way of nonlimiting example, where the structure being formed comprises, for example, an I-beam, the cross-sectional profile of the powder layer formed over the structure may exhibit a cross-sectional profile of the I-beam.

The powder delivery nozzles 404 (FIG. 14) may be controlled by a processor having associated therewith a memory including instructions configured to direct each powder delivery nozzle 404 to locations where powder from the respective powder delivery nozzle 404 should be provided. By way of nonlimiting example, the memory may include data for formation of a selected structure in the form of a computer-aided-design (CAD) model or a computer-aided-manufacturing (CAM) model configured to direct the powder delivery nozzles 404. In other embodiments, the laser 402 (FIG. 14) may be controlled by a processor having the instructions. In some such embodiments, the laser 402 may be configured to scan and expose a selected pattern of the powder layer over the structure to form bonds between selected portions of the powder layer and the uppermost layer of the structure.

Act 506 includes selectively exposing at least a portion of the powder layer to laser radiation, such as portions of the powder layer that are desired to be in the final structure, to form a layer of a structure. Exposing the powder layer to the laser radiation may form inter-granular bonds between adjacent particles of the powder layer and underlying layers of the structure previously formed. In some embodiments, exposing the powder layer to the laser radiation forms carbon-carbon bonds between particles of the powder layer and between particles of the powder layer and underlying particles of the structure previously formed. In some embodiments, such as where the second powder material comprises carbon (e.g., a carbide material), exposing the powder layer to the laser radiation may form carbon-carbon bonds between at least some particles of the first powder material and at least some particles of the second powder material. Exposing the powder layer to the laser radiation may further form metal-metal bonds between particles of the second powder material in the same layer and between particles of the second powder material in adjacent layers.

As described above, at least one of the movable stage 410 (FIG. 14) and the laser 402 (FIG. 14) may be operably coupled to a processor and an associated memory including instructions to move one or both of the movable stage 410 and the laser 402 in the X-Y plane. Accordingly, portions of the powder layer may be selectively exposed to the laser radiation while other portions of the powder layer are unexposed to the laser radiation. In some such embodiments, a shape of the structure being formed may exhibit any selected shape and each layer of the structure may have a different shape than other layers of the structure.

The laser 402 may be any suitable laser configured to provide energy in the form of electromagnetic radiation (e.g., laser radiation) to the powder layer. In some embodiments, the laser 402 is configured to provide electromagnetic radiation having a substantially monochromatic wavelength to the powder layer. By way of nonlimiting example, the laser 402 may comprise a helium-neon laser (having a wavelength of about 632.8 nm), an argon laser (having a wavelength of about 454.6 nm, about 488.0 nm, or about 514.5 nm), a krypton laser (having a wavelength between about 416 nm, about 530.9 nm, about 568.2 nm, 647.1 nm, about 676.4 nm, about 752.5 nm, or about 799.3 nm, a xenon ion laser, a nitrogen laser (having a wavelength of about 337.1 nm), a carbon dioxide laser (having a wavelength of about 10.6 μm), a carbon monoxide laser (having a wavelength between about 2.6 μm and about 4.0 μm or between about 4.8 μm and about 8.3 μm), an excimer laser (having a wavelength of about 193 nm, about 248 nm, about 308 nm, or about 353 nm), a fiber laser, or combinations thereof. However, the laser is not so limited and may comprise any suitable laser to provide sufficient energy to the powder layer to form bonds therein. The laser 402 may be configured to provide electromagnetic radiation having a power between about 10 W and about 1 kW, such as between about 10 W and about 50 W, between about 50 W and about 100 W, between about 100 W and about 500 W, or between 500 W and about 1 kW. However, the laser 402 may have a different power and the disclosure is not limited by laser type or power.

Exposing the powder layer to the laser radiation may locally heat the powder layer at regions that are exposed to the laser radiation. In some embodiments, the powder layer may be locally heated to temperatures sufficient to melt at least the second powder material. In some embodiments, the temperature may be between a melting temperature of the second powder material and a melting temperature of carbon (e.g., of carbon nanotube and of carbon nanofibers). In some such embodiments, the temperature may be less than about 3,500° C. By way of nonlimiting example, the temperature may be between about 500° C. and about 3,500° C., such as between about 500° C. and about 1,000° C., between about 1,000° C. and about 1,500° C., between about 1,500° C. and about 2,000° C., between about 2,000° C. and about 2,500° C., between about 2,500° C. and about 3,000° C., or between about 3,000° C. and about 3,500° C. In some embodiments, the temperature may be between about 1,400° C. and the sublimation temperature of carbon. In other embodiments, the temperature may be at least about 2,100° C.

In some embodiments, the second powder material may be selected to exhibit a greater thermal expansion that the first powder material. In some such embodiments, particles of the second powder material may condense or shrink onto particles of the first powder material responsive to cooling after exposure to the laser radiation. Such differences in thermal expansion and cooling of particles of the second powder material may form a physical (e.g., mechanical) bond between particles of the first powder material and particles of the second powder material in the same layer of the structure and in adjacent layers of the structure.

Act 508 includes repeating cycles of act 504 and act 506 until a net shape (i.e., a near final shape) of the structure is formed. After exposing the powder layer to laser radiation to form a layer of the structure, the structure may be moved a predetermined distance from the laser 402 (FIG. 14), which may correspond to a thickness of the layer of the structure previously formed. Another powder layer may be formed over the previously formed layer of the structure. The additional powder layer may exhibit the same or a different cross-sectional shape as previously formed layers of the structure.

The structure may be formed layer-by-layer to form a structure exhibiting a net shape of a final structure. Each layer of the structure may exhibit a different cross-sectional shape than other layers of the structure.

In some embodiments, the structure may be machined, heat treated, or a combination thereof, to a final shape after the additive manufacturing process.

The structure formed according to the method 500 may include one or more of structural members (e.g., beams), fasteners (e.g., screws), moving parts (e.g., propellers, crankshafts, etc.), tubes, channels, plates, electrically conductive members (e.g., electrodes, wires, etc.), a stage of a scanning electron microscope (SEM), or any other structure.

Figure 16:
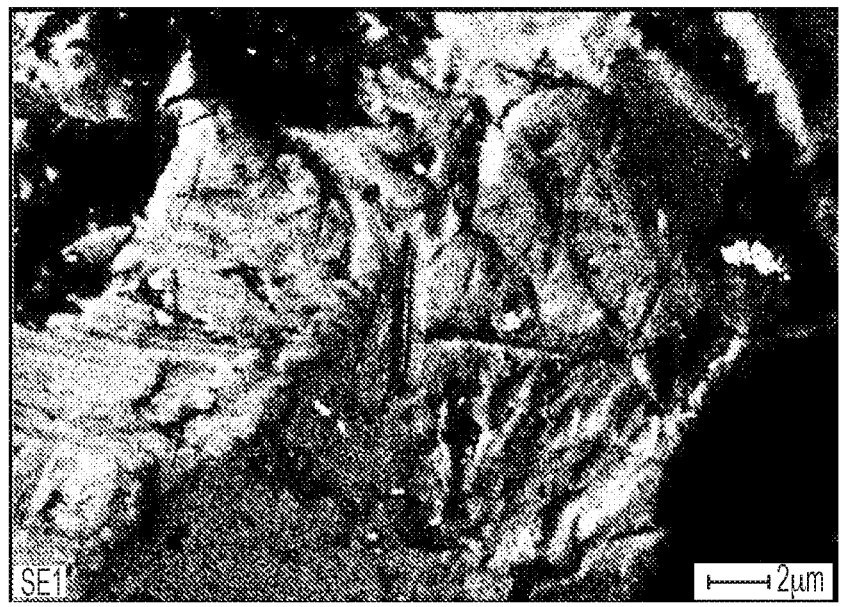
FIG. 16 is an energy-dispersive spectroscopy (EDS) of a structure formed according to methods described herein.

FIG. 16 is an energy-dispersive spectroscopy (EDS) of a structure formed according to the method 500 of FIG. 15. The structure comprised a stage of a scanning electron microscope. The structure comprised about 20.3 weight percent (wt. %) carbon, about 6.8 weight percent oxygen, about 0.9 weight percent sodium, about 61.6 weight percent aluminum, and about 10.4 weight percent silicon. The structure comprised about 35.1 atomic percent carbon, about 8.9 atomic percent oxygen, about 0.9 atomic percent sodium, about 47.4 atomic percent aluminum, and about 7.7 atomic percent silicon.

Figure 17:
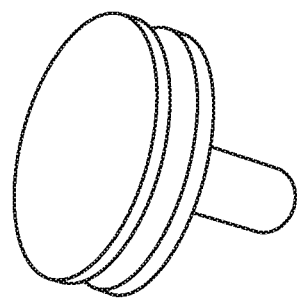
FIG. 17 is a picture of the structure of FIG. 16.

FIG. 17 is picture of the structure of FIG. 16. The structure exhibited covalently bonded carbon atoms. At least some of the carbon atoms were amorphous carbon and at least some of the carbon atoms were crystalline (e.g., graphitic).

In certain embodiments, sintered solid carbon products are formed in a belt-casting operation. A layer of CNTs and/or carbon nanofibers is placed on a moveable belt. The belt moves the CNTs and/or carbon nanofibers into a chamber containing a nonreactive environment. The CNTs and/or carbon nanofibers are sintered in the chamber, then cooled (e.g., in a portion of the chamber), and removed from the chamber. The process may be operated continuously, such as to form a sheet of sintered CNTs and/or carbon nanofibers.

In some embodiments, solid carbon products are further treated by electrodeposition to fill interstices in the solid carbon products with another material. A solution having materials to be deposited is prepared. The solvent of the solution may be water, an organic solvent, or an inorganic solvent. The solute may include a material such as a metal salt, an organic salt, a metalorganic salt, etc. Electroplating solutions are known in the art and not described in detail herein. The solid carbon product to be treated is contacted with the solution, such as by immersing the body in the solution. An electric potential (a direct-current voltage or an alternating-current voltage) is applied to the body to induce electrodeposition of one or more components of the solution. The composition, potential, temperature, and/or pressure are maintained until a selected amount of the material is deposited onto the solid carbon product. The solid carbon product is then removed from the solution and rinsed to remove excess solution.

Solid carbon products formed as described herein each include a plurality of cross-linked CNTs and/or carbon nanofibers. The CNTs define a plurality of voids, which may have a median minimum dimension of less than about 1 μm, less than about 500 nm, less than about 100 nm, less than about 50 nm, or even less than about 10 nm. Some or all of the carbon-containing material (e.g., the CNTs and/or the carbon nanofibers) may include a metal, such as a metal particle from which the CNTs and/or carbon nanofibers were formed, or a metal coating on the CNTs and/or carbon nanofibers. The solid carbon products may be structural members (e.g., beams), fasteners (e.g., screws), moving parts (e.g., propellers, crankshafts, etc.), electrically conductive members (e.g., electrodes, wires, etc.), or any other form. The solid carbon product may include another material dispersed in a continuous matrix surrounding and in contact with the CNTs and/or carbon nanofibers. The solid carbon products may have improved strength, toughness, impact resistance, and electrical and thermal conductivity in comparison to conventional materials.

In some embodiments, the solid carbon products also include other morphologies of carbon, interspersed with or otherwise secured to the CNTs and/or carbon nanofibers. For example, buckyballs may be connected to some of the CNTs and/or carbon nanofibers. As another example, one or more graphene sheets may be formed over all or a portion of a solid carbon product.

Both the compressed solid carbon products and the sintered solid carbon products described herein have a wide variety of potentially useful applications. For example, the compressed solid carbon products may be used as filters, molecular sieves, catalysts, and electrodes in applications where the additional mechanical integrity achieved through sintering is not necessary. The sintered solid carbon products can be used in the applications in which compressed solid carbon products can be used and in a wide variety of additional applications requiring additional mechanical integrity, electrical properties, and other material-property enhancements achieved through sintering.

Sintered solid carbon products may be useful components of armor because of their mechanical integrity, ability to absorb compressive loads with a high spring constant, and ability to dissipate heat. That is, sintered solid carbon products may be used to form projectile-resistant materials, such as armor plates, bullet-proof vests, etc. The light weight of the solid carbon products could improve mission payloads, increase vehicle range, and alter the center of gravity. For example, armor materials including sintered solid carbon products may be beneficial in preventing injury and death of occupants of vehicles such as Mine Resistant Ambush Protected vehicles ("MRAPs"), which are prone to tipping. Sintered solid carbon products as described herein may be effective in light-weight armament systems such as mortar tubes, gun barrels, cannon barrels, and other components. Sintered solid carbon products may also be beneficial in aerial vehicles, such as aircraft, spacecraft, missiles, etc.

EXAMPLES

Example 1

Sintering of Compacted CNTs

CNTs were formed as described in U.S. Patent Publication No. 2012/0034150 A1. Samples of approximately 1.0 grams to 1.25 grams of CNTs each were pressed in 15-mm diameter dies using a 100-ton (890-kN) press. The pressed samples were placed in an inert gas furnace (Model 1000-3060-FP20, available from Thermal Technology, LLC, of Santa Rosa, Calif.) and heated under vacuum at a rate of 25° C. until the samples reached 400° C. This temperature was maintained for 30 minutes to allow the samples to outgas any oxygen, water, or other materials present. The furnace was then filled with inert gas (argon or helium) at 3-5 psi (21 to 34 kPa) above atmospheric pressure. The furnace was heated at a rate of 20° C./min until the sample reached 1500° C. This temperature was maintained for 30 minutes. Heating continued at 5° C./min to a sintering temperature, which was maintained for a dwell time of 60 minutes. The samples were then cooled at 50° C./min to 1000° C., after which the furnace was shut down until the samples reached ambient temperature. The sample masses, compaction pressures, and sintering temperatures for the samples are shown in Table 1 below. The inert gas was helium for the samples sintered at 2400° C. and was argon for the other samples.

TABLE 1

Samples prepared in Example 1

| Sample | Mass (g) | Compaction Pressure (MPa) | Sintering Temperature (° C.) |
|---|---|---|---|
| 1 | 1.076 | 500 | 1800 |
| 2 | 1.225 | 750 | 1800 |
| 3 | 1.176 | 250 | 1800 |
| 4 | 1.113 | 500 | 2100 |
| 5 | 1.107 | 750 | 2100 |
| 6 | 1.147 | 250 | 2100 |
| 7 | 1.103 | 500 | 2400 |
| 8 | 1.198 | 750 | 2400 |
| 9 | 1.121 | 250 | 2400 |
| 10 | 1.128 | 250 | 1900 |
| 11 | 1.209 | 500 | 1900 |
| 12 | 1.212 | 750 | 1900 |
| 13 | 1.101 | 250 | 2000 |
| 14 | 1.091 | 500 | 2000 |
| 15 | 1.225 | 750 | 2000 |
| 16 | 1.078 | 250 | 1700 |
| 17 | 1.179 | 500 | 1700 |
| 18 | 1.157 | 750 | 1700 |

Samples 1 through 18 were harder and more robust than were the samples before the heating process. At the highest sintering temperature of 2400° C. (samples 7 through 9), the sintered pellets are flakier than the other sintered samples. All the samples prepared in Example 1 were qualitatively observed to be hard.

Figure 12:
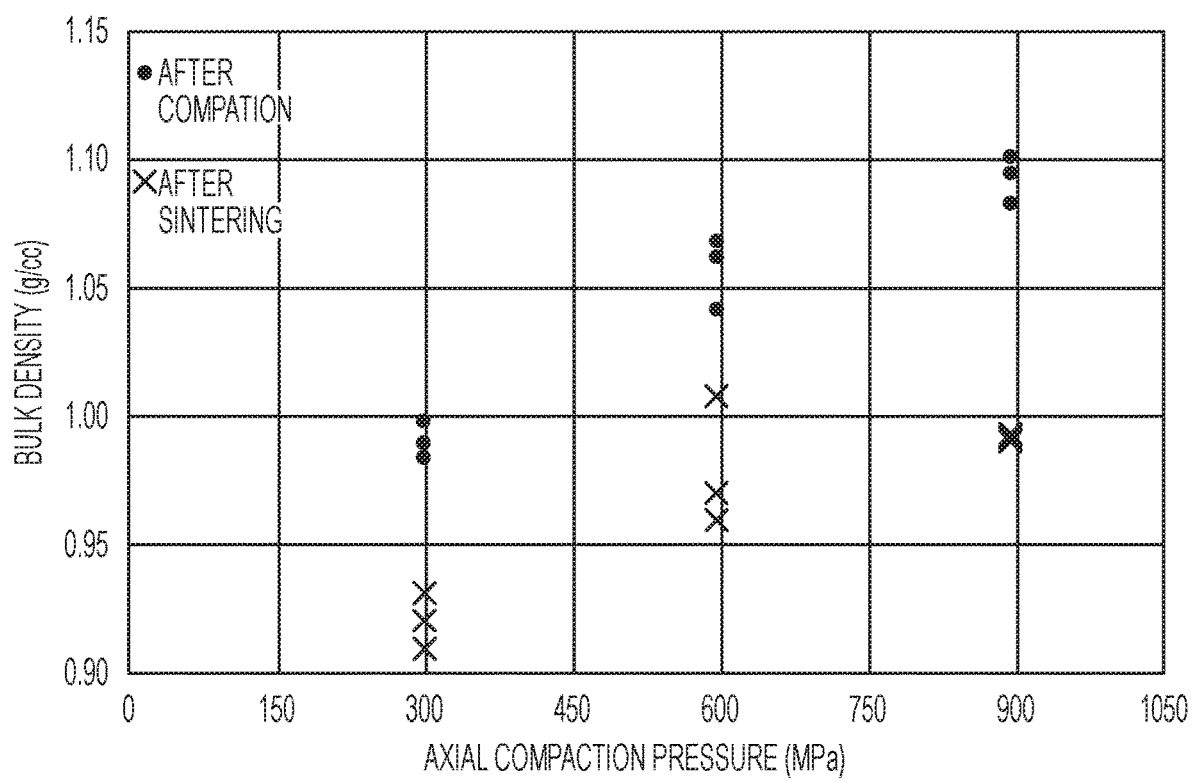
FIG. 12 is a graph showing bulk densities of solid carbon products formed by compaction and sintering.

Pycnometry tests show that the skeletal density decreases from 2.2 g/cm$^3$ for raw powders and raw compactions to 2.1 g/cm$^3$, 2.08 g/cm$^3$, and 2.05 g/cm$^3$ for the samples sintered at 1800° C., 2100° C., and 2400° C., respectively. Bulk density also decreased after sintering, in almost every case to less than 1.0 g/cm$^3$. Pellet thickness increased 5% to 9% during sintering, with the higher pressure compactions expanding more than the lower pressure compactions. The bulk densities of Samples 1 through 9 are shown in Table 2 and in FIG. 12.

TABLE 2

Properties of samples prepared in Example 1:

| | After Compaction | | After Sintering | | |
|---|---|---|---|---|---|
| Sample | Compaction Pressure (MPa) | Skeletal Density (g/cc) | Bulk Density (g/cc) | Sintering Temperature (° C.) | Skeletal Density (g/cc) | Bulk Density (g/cc) |
| 1 | 600 | 2.1992 | 1.043 | 1800 | 2.1095 | 0.960 |
| 2 | 900 | 2.2090 | 1.095 | 1800 | 2.0993 | 0.994 |
| 3 | 300 | | 0.990 | 1800 | 2.1131 | 0.921 |
| 4 | 600 | | 1.063 | 2100 | 2.0680 | 0.971 |
| 5 | 900 | | 1.084 | 2100 | 2.0817 | 0.992 |
| 6 | 300 | | 0.999 | 2100 | 2.0829 | 0.910 |
| 7 | 300 | | 0.985 | 2400 | 2.0553 | 0.932 |
| 8 | 600 | | 1.069 | 2400 | 2.0479 | 1.009 |
| 9 | 900 | | 1.102 | 2400 | 2.0666 | 0.991 |

Example 2

Spark Plasma Sintering of CNTs

CNTs were formed as described in U.S. Patent Publication No. 2012/0034150 A1. Graphite foil (available from Mineral Seal Corp., of Tucson, Ariz.) was lined into 20-mm diameter dies, and 2.0 g to 4.0 g of CNTs were placed over the foil. The samples were placed in a spark plasma sintering (SPS) system (model SPS 25-10, available from Thermal Technology, LLC, of Santa Rosa, Calif.). An axial pressure of approximately 5 MPa was applied to the CNT samples, and the SPS system was then evacuated to less than 3 mTorr (0.4 Pa). The sample was heated at 150° C./min to 650° C., and this temperature was maintained for one minute to allow the vacuum pump to re-evacuate any materials out-gassed. The pressure was increased to the compaction pressure of 30 MPa or 57 MPa, while simultaneously increasing the temperature at a rate of 50° C./min to 1500° C. The temperature and pressure were maintained for one minute. The temperature was then increased at 50° C./min to the sintering temperature, and maintained for 10 min or 20 min. After the dwell, the pressure was reduced to 5 MPa, and the sample allowed to cool at 150° C./min to 1000° C., after which the furnace was shut off until the samples reached ambient temperature.

The sample masses, compaction pressures, compaction rates, sintering temperatures, and dwell times for the samples are shown in Table 2 below.

TABLE 3

Samples prepared in Example 2:

| Sample | Mass (g) | Compaction Pressure (MPa) | Compaction rate (MPa/min) | Sintering Temperature (° C.) | Dwell time (min) |
|---|---|---|---|---|---|
| 19 | 2.449 | 57 | 13.0 | 1800 | 10 |
| 20 | 3.027 | 57 | 13.0 | 2100 | 10 |
| 21 | 4.180 | 57 | 13.0 | 1800 | 20 |
| 22 | 4.210 | 30 | 6.0 | 1800 | 10 |
| 23 | 4.417 | 30 | 6.0 | 1800 | 20 |

The SPS-sintered pellets formed in Example 2 were about 10 mm thick and had bulk densities between 1.3 g/cm$^3$ and 1.5 g/cm$^3$. To illustrate the strength of these samples, sample #20 was planned to be sintered 2100° C., but at about 1900° C., the die broke. The ram traveled significantly, crushing the graphite die. After the test was completed, the die was broken away from the sample. The sample remained visibly intact, though slightly thinner than expected. This would indicate that the sintering occurs at temperatures less than 1900° C., that the strength of SPS-sintered pellets is high, even at extreme temperatures, and that the sintered samples are strong enough to resist an applied force without fracturing.

The bulk densities of the samples with the graphite foil still attached were determined. For the samples weighing about 4 g (i.e., samples #21, #22, and #23), bulk densities were between 1.35 g/cm$^3$ and 1.50 g/cm$^3$. The volume resistivity and electrical conductivity of the samples were also measured. These data are shown in Table 4. The samples are more conductive than amorphous carbon, and nearly as conductive as graphite.

TABLE 4

Properties of samples prepared in Example 2:

| Sample | Density (g/cm$^3$) | Resistance (Ω) | Resistivity (Ω · m) | Electrical Conductivity (S/m) |
|---|---|---|---|---|
| 19 | 1.588 | 2.42 × 10$^{-3}$ | 4.98 × 10$^{-5}$ | 2.01 × 10$^{-4}$ |
| 20 | 1.715 | 2.02 × 10$^{-3}$ | 4.77 × 10$^{-5}$ | 2.10 × 10$^{-4}$ |
| 21 | 1.494 | 3.24 × 10$^{-3}$ | 1.23 × 10$^{-4}$ | 8.14 × 10$^{-3}$ |
| 22 | 1.350 | 3.80 × 10$^{-3}$ | 1.62 × 10$^{-4}$ | 6.19 × 10$^{-3}$ |
| 23 | 1.429 | 3.7 × 10$^{-3}$ | 1.57 × 10$^{-4}$ | 6.37 × 10$^{-3}$ |

Although the foregoing description contains many specifics, these are not to be construed as limiting the scope of the present invention, but merely as providing certain embodiments. Similarly, other embodiments of the invention may be devised which do not depart from the scope of the present invention. For example, features described herein with reference to one embodiment also may be provided in others of the embodiments described herein. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. A method of forming a structure comprising solid carbon products by additive manufacturing, the method comprising:
    providing a first layer of a powder mixture over a substrate, the powder mixture comprising at least one solid carbon product selected from the group consisting of carbon nanotubes and carbon nanofibers and a material selected from the group consisting of a metal material and a ceramic material;
    exposing the first layer of the powder mixture to electromagnetic radiation from a laser to form a first layer of a structure comprising covalently bonded carbon atoms, wherein exposing the first layer of the powder mixture to electromagnetic radiation comprises exposing the first layer of the powder mixture to at least a melting temperature of the material and below a melting temperature of the at least one solid carbon product;
    forming a second layer of the powder mixture over the first layer of the structure; and
    exposing the second layer of the powder mixture to electromagnetic radiation from the laser to form a second layer of the structure comprising covalently bonded carbon atoms and to form covalent bonds between carbon atoms of the first layer of the structure and carbon atoms of the second layer of the structure.

2. The method of claim 1, further comprising:
    selecting the first layer of the powder mixture to comprise carbon nanotubes.

3. The method of claim 1, further comprising:
    selecting the first layer of the powder mixture to comprise carbon nanofibers.

4. The method of claim 1, further comprising selecting the metal material from the group consisting of at least one material selected from the group consisting of aluminum, silicon, phosphorus, sulfur, titanium, vanadium, chromium, manganese, iron, cobalt, nickel, copper, zinc, zirconium, palladium, silver, cadmium, tin, tantalum, tungsten, platinum, and gold.

5. The method of claim 1, wherein providing a first layer of a powder mixture over a substrate comprises selecting the at least one solid carbon product to constitute between about 1 weight percent and about 50 weight percent of the powder mixture.

6. The method of claim 5, wherein providing a first layer of a powder mixture over a substrate comprises providing a powder mixture comprising between about 50 weight percent and about 99 weight percent of the material over the substrate.

7. The method of claim 1, wherein providing a first layer of a powder mixture over a substrate comprises providing a first layer of a powder mixture having a thickness between about 10 nm and about 100 μm over the substrate.

8. The method of claim 1, wherein providing a first layer of a powder mixture over a substrate comprises providing the first layer over the substrate such that the first layer exhibits a cross-sectional shape of a structure selected from the group consisting of a beam, a fastener, a propeller, a crankshaft, a gear, a bushing, a piston, a turbine, a turbine blade, and engine block, and an electrically conductive member.

9. The method of claim 1, wherein providing a first layer of a powder mixture over a substrate comprises providing a powder mixture comprising particles selected from the group consisting of carbon nanotubes and carbon nanofibers coated with the material over the substrate.

10. The method of claim 1, wherein providing a first layer of a powder mixture comprising over a substrate comprises providing a powder mixture comprising particles of the material coated with the at least one solid carbon product.

11. The method of claim 1, further comprising selecting the material from the group consisting of nickel, vanadium oxide, palladium, platinum, gold, ruthenium, rhodium, and iridium.

12. The method of claim 1,
further comprising selecting the ceramic material from the group consisting of at least one carbide, at least one oxide, at least one nitride, at least one silicide, and at least one boride.

13. The method of claim 1, wherein exposing the first layer of the powder mixture to electromagnetic radiation comprises melting the metal material while the at least one solid carbon product remains in a solid state.

* * * * *